United States Patent
Zhamu et al.

(10) Patent No.: US 11,631,838 B2
(45) Date of Patent: *Apr. 18, 2023

(54) GRAPHENE-ENHANCED ANODE PARTICULATES FOR LITHIUM ION BATTERIES

(71) Applicant: SAMSUNG ELECTRONICS CO., LTD., Suwon-si (KR)

(72) Inventors: Aruna Zhamu, Centerville, OH (US); Jinjun Shi, Hilliard, OH (US); Guorong Chen, Fairborn, OH (US); Qing Fang, Fairborn, OH (US); Bor Z. Jang, Centerville, OH (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 347 days.

This patent is subject to a terminal disclaimer.

(21) Appl. No.: 16/737,657

(22) Filed: Jan. 8, 2020

(65) Prior Publication Data

US 2020/0185704 A1 Jun. 11, 2020

Related U.S. Application Data

(63) Continuation of application No. 15/403,759, filed on Jan. 11, 2017, now Pat. No. 10,559,811, which is a
(Continued)

(51) Int. Cl.
*H01M 4/133* (2010.01)
*H01M 4/587* (2010.01)
(Continued)

(52) U.S. Cl.
CPC ............ *H01M 4/133* (2013.01); *B82Y 30/00* (2013.01); *H01B 1/04* (2013.01); *H01M 4/0471* (2013.01); *H01M 4/13* (2013.01); *H01M 4/131* (2013.01); *H01M 4/139* (2013.01); *H01M 4/386* (2013.01); *H01M 4/483* (2013.01); *H01M 4/523* (2013.01); *H01M 4/587* (2013.01); *H01M 4/625* (2013.01); *H01M 10/0525* (2013.01);
(Continued)

(58) Field of Classification Search
CPC .. H01M 10/0525; H01M 4/0471; H01M 4/13; H01M 4/131; H01M 4/133; H01M 4/139; H01M 4/386; H01M 4/387; H01M 4/48; H01M 4/483; H01M 4/523; H01M 4/5825; H01M 4/587; H01M 4/625
See application file for complete search history.

(56) References Cited

U.S. PATENT DOCUMENTS 2,798,878 A 7/1957 Hummers
6,733,922 B2 5/2004 Matsubara et al.
(Continued)

OTHER PUBLICATIONS

U.S. Appl. No. 11/879,680, filed Jul. 19, 2007, A. Zhamu, et al.
(Continued)

*Primary Examiner* — Carlos Barcena
(74) *Attorney, Agent, or Firm* — Cantor Colburn LLP

(57) ABSTRACT

Disclosed herein is a composite particulate comprising a plurality of active material particles; and a single graphene sheet or a plurality of graphene sheets surrounds the plurality of active material particles and a surface of the composite particulate, wherein a single graphene sheet or a plurality of graphene sheets provides an electron-conducting path.

30 Claims, 11 Drawing Sheets

Related U.S. Application Data continuation of application No. 12/807,635, filed on Sep. 10, 2010, now Pat. No. 9,558,860.

(51) Int. Cl.

| | | |
|---|---|---|
| *H01M 4/52* | (2010.01) | |
| *H01M 4/48* | (2010.01) | |
| *H01M 4/131* | (2010.01) | |
| *H01M 4/62* | (2006.01) | |
| *H01M 4/38* | (2006.01) | |
| *H01M 4/139* | (2010.01) | |
| *H01M 4/13* | (2010.01) | |
| *H01M 4/04* | (2006.01) | |
| *H01M 10/0525* | (2010.01) | |
| *B82Y 30/00* | (2011.01) | |
| *H01B 1/04* | (2006.01) | |
| *H01M 4/58* | (2010.01) | |

(52) U.S. Cl.
CPC .............. *H01M 4/387* (2013.01); *H01M 4/48* (2013.01); *H01M 4/5825* (2013.01); *Y02E 60/10* (2013.01)

(56) References Cited

U.S. PATENT DOCUMENTS

| | | | |
|---|---|---|---|
| 7,071,258 | B1 | 7/2006 | Jang et al. |
| 9,558,860 | B2 | 1/2017 | Zhamu et al. |
| 2005/0136330 | A1 | 6/2005 | Mao et al. |
| 2005/0271574 | A1 | 12/2005 | Jang et al. |
| 2007/0020519 | A1 | 1/2007 | Kim et al. |
| 2007/0122701 | A1 | 5/2007 | Yamaguchi |
| 2009/0117467 | A1 | 5/2009 | Zhamu et al. |
| 2009/0186276 | A1 | 7/2009 | Zhamu et al. |
| 2009/0317719 | A1* | 12/2009 | Luhrs ............... H01M 4/387 977/775 |
| 2010/0092808 | A1 | 4/2010 | Guerfi et al. |
| 2010/0176351 | A1 | 7/2010 | Ruoff et al. |
| 2010/0291438 | A1 | 11/2010 | Ahn et al. |
| 2011/0111303 | A1* | 5/2011 | Kung ............... H01B 1/18 429/231.8 |
| 2011/0165465 | A1 | 7/2011 | Kim et al. |
| 2011/0292570 | A1 | 12/2011 | Ivanovici et al. |

OTHER PUBLICATIONS

U.S. Appl. No. 11/982,672, filed Nov. 5, 2007, A. Zhamu, et al.
U.S. Appl. No. 12/009,259, filed Jan. 18, 2008, A.Zhamu, et al.
U.S. Appl. No. 12/156,644, filed Jun. 4, 2008, J. Shi, et al.
U.S. Appl. No. 12/315,555, filed Dec. 4, 2008, A. Zhamu, et al.
D. Wang, et al. "Self-Assembled $TiO_2$-Graphene Hybrid Nanostructures for Enhanced Li-Ion Insertion." ACS Nano, 3 (2009) 907-914.
G. Wang, et al. "Sn/Graphene Nanocomposite with 3D Architecture for Enhanced Reversible Lithium Storage Batteries," J. Materials Chemistry, 19 (2009) 8378-8384.
H. Lee, "Carbon-Coated Nano-Si Dispersed Oxides/Graphite Composites as Anode Material for Lithium Ion Batteries," Electrochemistry Communications, 6 (2004) 465-469.
J. K. Lee, et al., "Silicon nanoparticles-graphene paper composites for Li ion battery anodes," Chem. Commun., 46 (2010) 2025-2027.
J. R. Li, Z.L. Tang, S.H. Luo, J.B. Lu, Z.T. Zhang. Spinel $Li_4Ti_5O_{12}$/C Composites as Potential Anode Materials of Lithium Batteries, Key Engineering Mater. 2007, vol. 336-338, 513-516.
J. Yang, et al., "Si/C Composites for High-Capacity Lithium Storage Materials," Electrochemical and Solid-State Letters, 6 (8) (2003) A 154-A 156.
J. Yao, et al. "In Situ Chemical Synthesis of $SnO_2$—Graphene Nanocomp as Anode Mat. for Li-Ion Batteries," Electrochemistry Communications, 11 (2009) 1849-1852.
M. Yoshio, et al., "Carbon-coated Si as a Lithium-Ion Battery Anode Material," J. of the Electrochemical Soc., 149 (12) (2002) A1598-A1603.
N. Dimov, et al., "Carbon-coated Silicon as Anode Material for Lithium Ion Batteries: Advantages and Limitations," Electrochimica Acta, 48 (2003) 1579-1587.
N. Dimov, et al., "Characterization of Carbon-coated Silicon Structural Evolution and Possible Limitations," J. of Power source, 114 (2003) 88-95.
NFOA, Issued Aug. 19, 2015.
Non-Final Office Action dated Mar. 11, 2019.
S. M. Paek, et al. "Enhanced Cyclic Performance and Li Storage Capacity of $SnO_2$/Graphene Nanoporous Electrodes with 3-D Delaminated Structure." Nano Letters, 9 (2009) 72-75.
Z. S. Wen, et al., "High-Capacity Silicon/Carbon Composite Anode Materials for Lithium Ion Batteries," Electrochemistry Communications, 5 (2003) 165-168.

\* cited by examiner

FIG. 7 (A) prior art

GRAPHENE-ENHANCED ANODE PARTICULATES FOR LITHIUM ION BATTERIES

CROSS-REFERENCE TO RELATED APPLICATIONS

This application is a continuation application of U.S. patent application Ser. No. 15/403,759 filed Jan. 11, 2017, and further claims the benefit of an earlier filing date from U.S. patent application Ser. No. 12/807,635 (now U.S. Pat. No. 9,558,860B2), filed Sep. 10, 2010, the contents of which are incorporated by reference herein in their entirety.

This invention is based on research results of a project supported by the US NSF SBIR-STTR Program.

FIELD OF THE INVENTION

The present invention relates generally to the field of lithium-ion batteries and, in particular, to a nano graphene-enhanced anode for a lithium-ion battery.

BACKGROUND

The discussion of prior art is primarily based on the references listed at the end of this "Background" section.

The most commonly used anode materials for lithium-ion batteries are natural graphite and synthetic graphite (artificial graphite) that can be intercalated with lithium and the resulting graphite intercalation compound (GIC) may be expressed as $Li_xC_6$, where x is typically less than 1. The maximum amount of lithium that can be reversibly intercalated into the interstices between graphene planes of a perfect graphite crystal corresponds to x=1, defining a theoretical specific capacity of 372 mAh/g.

Graphite or carbon anodes can have a long cycle life due to the presence of a protective surface-electrolyte interface layer (SEI), which results from the reaction between lithium and the electrolyte (or between lithium and the anode surface/edge atoms or functional groups) during the first several charge-discharge cycles. The lithium in this reaction comes from some of the lithium ions originally intended for the charge transfer purpose. As the SEI is formed, the lithium ions become part of the inert SEI layer and become irreversible, i.e. they can no longer be the active element for charge transfer. Therefore, it is desirable to use a minimum amount of lithium for the formation of an effective SEI layer. In addition to SEI formation, the irreversible capacity loss $Q_{ir}$ can also be attributed to graphite exfoliation caused by electrolyte/solvent co-intercalation and other side reactions.

In addition to carbon- or graphite-based anode materials, other inorganic materials that have been evaluated for potential anode applications include metal oxides, metal nitrides, metal sulfides, and the like, and a range of metals, metal alloys, and intermetallic compounds that can accommodate lithium atoms/ions or react with lithium. Among these materials, lithium alloys having a composition formula of $Li_aA$ (A is a metal such as Al, and "a" satisfies 0<a≤5) are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). However, in the anodes composed of these materials, severe pulverization (fragmentation of the alloy particles) occurs during the charge and discharge cycles due to expansion and contraction of the anode active material induced by the insertion and extraction of the lithium ions in and out of the anode active material. The expansion and contraction, and the resulting pulverization of active material particles lead to loss of contacts between active particles and conductive additives and loss of contacts between the anode active material and its current collector. This degradation phenomenon is illustrated in FIG. 1. These adverse effects result in a significantly shortened charge-discharge cycle life.

To overcome the problems associated with such mechanical degradation, three technical approaches have been followed:

(1) reducing the size of the active material particle, presumably for the purpose of reducing the strain energy that can be stored in a particle, which is a driving force for crack formation in the particle. However, a reduced particle size implies a higher surface area available for potentially reacting with the liquid electrolyte. Such a reaction is undesirable since it is a source of irreversible capacity loss.

(2) depositing the electrode active material in a thin film form directly onto a current collector, such as a copper foil. However, such a thin film structure with an extremely small thickness-direction dimension (typically much smaller than 500 nm) implies that only a small amount of active material can be incorporated in an electrode (given the same electrode or current collector surface area), providing a low total lithium storage capacity (even though the capacity per unit mass can be large).

(3) using a composite composed of small electrode active particles supported with or protected by a less active or non-active matrix, e.g., carbon-coated Si particles [Refs. 1-3], sol gel graphite-protected Si, metal oxide-coated Si or Sn [Ref. 4], and monomer-coated Sn nano particles [Ref 5]. Presumably, the protective matrix provides a cushioning effect for particle expansion or shrinkage, and prevents the electrolyte from contacting and reacting with the electrode active material. Examples of anode active particles are Si, Sn, and $SnO_2$. However, most of prior art composite electrodes have deficiencies in some ways, e.g., in most cases, less than satisfactory reversible capacity, poor cycling stability, high irreversible capacity, ineffectiveness in reducing the internal stress or strain during the lithium ion insertion and extraction steps, and other undesirable side effects.

It may be further noted that the coating or matrix materials used to protect active particles (such as Si and Sn) are carbon, sol gel graphite, metal oxide, monomer, ceramic, and lithium oxide. These protective materials are all very brittle, weak (of low strength), and/or non-conducting (e.g., ceramic or oxide coating). Ideally, the protective material should meet the following requirements: (a) The coating or matrix material should be of high strength and stiffness so that it can help to refrain the electrode active material particles, when lithiated, from expanding to an excessive extent. (b) The protective material should also have high fracture toughness or high resistance to crack formation to avoid disintegration during repeated cycling. (c) The protective material must be inert (inactive) with respect to the electrolyte, but be a good lithium ion conductor. (d) The protective material must not provide any significant amount of defect sites that irreversibly trap lithium ions. The prior art protective materials all fall short of these requirements. Hence, it was not surprising to observe that the resulting anode typically shows a reversible specific capacity much lower than expected. In many cases, the first-cycle efficiency is extremely low (mostly lower than 80% and some even lower than 60%). Furthermore, in most cases, the electrode was not capable of operating for a large number of cycles.

Additionally, most of these electrodes are not high-rate capable, exhibiting unacceptably low capacity at a high discharge rate.

Complex composite particles of particular interest are a mixture of separate Si and graphite particles dispersed in a carbon matrix prepared by J. Yang, et al. [Ref. 6], Wen, et al [Ref. 7] and by Mao, et al. [Ref. 8], carbon matrix containing complex nano Si (protected by oxide) and graphite particles dispersed therein [Ref. 9], and carbon-coated Si particles distributed on a surface of graphite particles [Ref. 10]. Again, these complex composite particles led to a low specific capacity or for up to a small number of cycles only. It appears that carbon by itself is relatively weak and brittle and the presence of micron-sized graphite particles does not improve the mechanical integrity of carbon since graphite particles are themselves relatively weak. Graphite was used in these cases presumably for the purpose of improving the electrical conductivity of the anode material. Furthermore, polymeric carbon, amorphous carbon, or pre-graphitic carbon may have too many lithium-trapping sites that irreversibly capture lithium during the first few cycles, resulting in excessive irreversibility.

In summary, the prior art has not demonstrated a composite material that has all or most of the properties desired for use as an anode material in a lithium-ion battery. Thus, there is an urgent and continuing need for a new anode for the lithium-ion battery that has a high cycle life, high reversible capacity, low irreversible capacity, small particle sizes (for high-rate capacity), and compatibility with commonly used electrolytes. There is also a need for a method of readily or easily producing such a material in large quantities.

In response to these needs, one of our earlier applications discloses a nano-scaled graphene platelet-based composite composition for use as a lithium ion battery anode. This composition comprises: (a) micron- or nanometer-scaled particles or coating of an anode active material; and (b) a plurality of nano-scaled graphene platelets (NGPs), wherein a platelet comprises a graphene sheet or a stack of graphene sheets having a platelet thickness less than 100 nm and wherein the particles or coating are physically attached or chemically bonded to NGPs. Nano graphene platelets (NGPs) are individual graphene sheets (individual basal planes of carbon atoms isolated from a graphite crystal) or stacks of multiple graphene planes bonded together in the thickness direction. The NGPs have a thickness less than 100 nm and a length, width, or diameter that can be greater or less than 10 µm. The thickness is more preferably less than 10 nm and most preferably less than 1 nm.

Disclosed in another patent application of ours [15] is a more specific composition, which is composed of a 3-D network of NGPs and/or other conductive filaments and select anode active material particles that are bonded to these NGPs or filaments through a conductive binder. Yet another application [16], as schematically shown in FIGS. 2(A) and 2(B), provides a nano graphene-reinforced nanocomposite solid particle composition containing NGPs and electrode active material particles, which are both dispersed in a protective matrix (e.g. a carbon matrix).

FIG. 2(A) is a prior art depiction of a nanocomposite solid particle 100 that comprises a protective matrix material (e.g., carbon) 102 that contains fine particles of electro-active material (e.g., Si nano particles) 104 and nanographene platelets 106. FIG. 2(B) is a prior art depiction of another nanocomposite solid particle 200 that comprises nano-wires or nano-tubes of electro-active material (e.g., Si) 202, a protective matrix material (e.g., carbon) 204 and nano graphene platelets 206.

After our discovery of graphene providing an outstanding support for anode active materials [14-16], many subsequent studies by others [e.g. 17-21] have confirmed the effectiveness of this approach. For instance, Wang, et al. [17] investigated self-assembled $TiO_2$-graphene hybrid nanostructures for enhanced Li-ion insertion. The results indicate that, as compared with the pure $TiO_2$ phase, the specific capacity of the hybrid was more than doubled at high charge rates. The improved capacity at a high charge-discharge rate was attributed to increased electrode conductivity afforded by a percolated graphene network embedded into the metal oxide electrodes. However, all these earlier studies were focused solely on providing a network of electron-conducting paths for the anode active material particles and failed to address other critical issues, such as ease of anode material processing, electrode processability, electrode tap density (the ability to pack a dense mass into a given volume), and long-term cycling stability. For instance, the method of preparing self-assembled hybrid nanostructures [17] is not amenable to mass production. The anode material particle-coated graphene sheets alone are not suitable for electrode fabrication (due to the difficulty in coating the materials onto a current collector), and the resulting electrodes are typically too low in the tap density. Paper-based composite structures [21] are not compatible with current lithium-ion battery production equipment. These are all critically important issues that must be addressed in a real battery manufacturing environment.

Herein reported is a further improved anode composition that provides not only a robust 3-D network of electron-conducting paths and high conductivity, but also enables the anode materials to be readily made into electrodes with a high electrode tap density and long-term cycling stability. Both the reversible capacity and the first-cycle efficiency are also significantly improved over those of state-of-the-art anode materials.

REFERENCES

1. M. Yoshio, et al., "Carbon-coated Si as a Lithium-Ion Battery Anode Material," J. of the Electrochemical Soc., 149 (12) (2002) A1598-A1603.
2. N. Dimov, et al., "Characterization of Carbon-coated Silicon Structural Evolution and Possible Limitations," J. of Power source, 114 (2003) 88-95.
3. N. Dimov, et al., "Carbon-coated Silicon as Anode Material for Lithium Ion Batteries: Advantages and Limitations," Electrochimica Acta, 48 (2003) 1579-1587.
4. H. Yamaguchi, "Anode Material, Anode and Battery," U.S. 2007/0122701 (Pub. May 31, 2007).
5. H. Kim, et al., "Anode Active Material, Manufacturing Method Thereof, and Lithium Battery Using the Anode Active Material," U.S. 2007/0020519 (Pub. Jan. 25, 2007).
6. J. Yang, et al., "Si/C Composites for High-Capacity Lithium Storage Materials," Electrochemical and Solid-State Letters, 6 (8) (2003) A154-A156.
7. Z. S. Wen, et al., "High-capacity Silicon/Carbon Composite Anode Materials for Lithium Ion Batteries," Electrochemistry Communications, 5 (2003) 165-168.
8. Z. Mao, et al. "Carbon-coated Silicon Particle Powder as the Anode Material for Lithium Batteries and the Method of Making the Same," U.S. 2005/0136330 (Jun. 23, 2005).

9. H. Y. Lee and S. M. Lee, "Carbon-Coated Nano-Si Dispersed Oxides/Graphite Composites as Anode Material for Lithium Ion Batteries," Electrochemistry Communications, 6 (2004) 465-469.
10. K. Matsubara, et al., "Carbonaceous Material and Lithium Secondary Batteries Comprising Same," U.S. Pat. No. 6,733,922 (May 11, 2004).
11. B. Z. Jang and W. C. Huang, "Nano-scaled Graphene Plates," U.S. Pat. No. 7,071,258 (Jul. 4, 2006).
12. B. Z. Jang, L. X. Yang, S. C. Wong, and Y. J. Bai, "Process for Producing Nano-scaled Graphene Plates," U.S. patent application Ser. No. 10/858,814 (Jun. 3, 2004).
13. A. Zhamu, J. Jang, J. Shi, and B. Z. Jang, "Method of Producing Ultra-thin Nano-Scaled Graphene Platelets," U.S. patent application Ser. No. 11/879,680 (Jul. 19, 2007).
14. Aruna Zhamu and Bor Z. Jang, "Nano Graphene Platelet-Based Composite Anode Compositions for Lithium Ion Batteries," U.S. patent application Ser. No. 11/982,672 (Nov. 5, 2007); Now U.S. Pat. No. 7,745,047 (Jun. 29, 2010).
15. Jinjun Shi, Aruna Zhamu and Bor Z. Jang, "Conductive Nanocomposite-based Electrodes for Lithium Batteries," U.S. patent application Ser. No. 12/156,644 (Jun. 4, 2008).
16. Aruna Zhamu, Bor Z. Jang, and Jinjun Shi, "Nano Graphene Reinforced Nanocomposite for Lithium Battery Electrodes," U.S. patent application Ser. No. 12/315,555 (Dec. 4, 2008).
17. D. Wang, et al. "Self-Assembled $TiO_2$-Graphene Hybrid Nanostructures for Enhanced Li-Ion Insertion." ACS Nano, 3 (2009) 907-914.
18. S. M. Paek, et al. "Enhanced Cyclic Performance and Lithium Storage Capacity of $SnO_2$/Graphene Nanoporous Electrodes with Three-Dimensionally Delaminated Flexible Structure," Nano Letters, 9 (2009) 72-75.
19. J. Yao, et al "In Situ Chemical Synthesis of $SnO_2$—Graphene Nanocomposite as Anode Materials for Lithium-Ion Batteries," Electrochemistry Communications, 11 (2009) 1849-1852.
20. G. Wang, et al., "Sn/Graphene Nanocomposite with 3D Architecture for Enhanced Reversible Lithium Storage Batteries," J. Materials Chemistry, 19 (2009) 8378-8384.
21. J. K. Lee, et al., "Silicon nanoparticles-graphene paper composites for Li ion battery anodes," Chem. Commun., 46 (2010) 2025-2027.

SUMMARY OF THE INVENTION

The present invention provides a nano graphene-enhanced particulate for use as a lithium-ion battery anode active material, wherein the particulate is formed of a single or a plurality of graphene sheets and a plurality of fine anode active material particles (with a size smaller than 10 μm, preferably smaller than 1 μm, and most preferably smaller than 100 nm). The graphene sheets and the fine active particles (herein referred to as primary particles) are mutually bonded or agglomerated into the particulate (herein referred to as a secondary particle) with at least a graphene sheet embracing the anode active material particles. Graphene is in an amount of at least 0.01% by weight (preferably at least 0.1% by weight and more preferably at least 1% by weight, but typically much lower than 99%, more typically less than 90%, and most typically less than 70% by weight) and the anode active material is in an amount of at least 0.1% by weight (typically higher than 10% by weight), all based on the total weight of the particulate. The particulate is approximately spherical or ellipsoidal in shape.

The graphene sheets inside or on the exterior surface of this particulate preferably comprise single-layer graphene or few-layer graphene, wherein few-layer graphene is defined as a graphene platelet formed of less than 10 graphene planes of carbon atoms.

There is no restriction on the type and nature of the anode active material that can be used to practice the present invention. Most preferably, the anode active material may comprise Sn or Si as a primary element with Si or Sn content no less than 20% by weight based on the total weight of the anode active material. However, the anode active material may comprise an element selected from Si, Ge, Sn, Cd, Sb, Pb, Bi, Zn, Al, Co, Ni, or Ti. Specifically, the anode active material may be selected from the group consisting of:

(a) silicon (Si), germanium (Ge), tin (Sn), lead (Pb), antimony (Sb), bismuth (Bi), zinc (Zn), aluminum (Al), titanium (Ti), Nickel (Ni), cobalt (Co), and cadmium (Cd);

(b) alloys or intermetallic compounds of Si, Ge, Sn, Pb, Sb, Bi, Zn, Al, Ti, Co, Ni, or Cd with other elements, wherein said alloys or compounds are stoichiometric or non-stoichiometric;

(c) oxides, carbides, nitrides, sulfides, phosphides, selenides, and tellurides of Si, Ge, Sn, Pb, Sb, Bi, Zn, Al, Ti, Co, Ni, Fe, or Cd, and their mixtures, composites, or lithium-containing composites;

(d) salts and hydroxides of Sn;

(e) lithium titanate, lithium manganate, lithium aluminate, lithium-containing titanium oxide, lithium transition metal oxide; and (f) combinations thereof.

The anode active material particles in the particulate preferably have a dimension smaller than 1 μm, further preferably smaller than 100 nm. A particularly useful class of the anode active material for electric vehicle batteries is lithiated titanium dioxide, lithiated titanium oxide, lithium titanate, or $Li_4Ti_5O_{12}$ due to their high-rate capability (can be charged and discharged in high rates).

The anode active material may also be selected from particles of natural graphite, artificial graphite, meso-carbon micro-bead (MCMB), graphitic coke, meso-phase carbon, hard carbon, soft carbon, polymeric carbon, carbon or graphite fiber segments, carbon nano-fiber or graphitic nano-fiber, carbon nano-tube, or a combination thereof. We have surprisingly observed that all these carbon-based materials can be embraced inside an envelope or skin constituted by a graphene sheet or multiple graphene sheets.

The particulate may further comprise therein a carbon or graphite material in electronic contact with the anode active material and a graphene sheet. The carbon or graphite material may be coated on or in contact with at least one of the anode active material particles or a graphene sheet, wherein the carbon or graphite material is selected from polymeric carbon, amorphous carbon, chemical vapor deposition carbon, coal tar pitch, petroleum pitch, meso-phase pitch, carbon black, coke, acetylene black, activated carbon, fine expanded graphite particle with a dimension smaller than 100 nm, artificial graphite particle, natural graphite particle, or a combination thereof. The polymeric carbon or amorphous carbon may be obtained from pyrolyzation of a polymer selected from the group consisting of phenol-formaldehyde, polyacrylonitrile, styrene-based polymers, cellulosic polymers, epoxy resins, and combinations thereof.

The nano graphene platelets may be obtained from intercalation and exfoliation of a layered or laminar graphite to produce graphite worms composed of exfoliated flakes that are loosely interconnected. The exfoliation is followed by separation of these flakes or platelets. The laminar graphite may be selected from a natural graphite, synthetic graphite, highly oriented pyrolytic graphite, graphite fiber, carbon fiber, carbon nano-fiber, graphitic nano-fiber, spherical graphite or graphite globule, meso-phase micro-bead, meso-phase pitch, graphitic coke, or graphitized polymeric carbon. Natural graphite is particularly desirable due to its abundant availability and low cost.

Another embodiment of the present invention is a process for preparing the presently invented graphene-enhanced anode particulate. In one preferred embodiment, the process comprises: (a) preparing a precursor mixture of graphene or graphene precursor with an anode active material or anode active material precursor; and (b) thermally and/or chemically converting the precursor mixture to the graphene-enhanced anode particulate. The step of preparing a precursor mixture may comprise preparing a suspension of graphene or graphene precursor (e.g. graphene oxide or graphene fluoride) in a liquid medium and mixing an anode active material or anode active material precursor in the suspension to form a multi-component suspension. The process may further comprise a step of drying the multi-component suspension to form the precursor mixture.

The step of drying the multi-component suspension to form the precursor mixture is most preferably conducted using a spray-drying, spray-pyrolysis, fluidized-bed drying procedure, or any procedure that involves an atomization or aerosolizing step. The step of converting may comprise a sintering, heat-treatment, spray-pyrolysis, or fluidized bed drying or heating procedure. The step of converting may comprise a procedure of chemically or thermally reducing the graphene precursor to reduce or eliminate oxygen or fluorine content and other non-carbon elements of the graphene precursor, which graphene precursor may contain graphene oxide or graphene fluoride. Upon conversion, the graphene in the particulate has an oxygen content typically less than 5% by weight.

In another preferred embodiment, the step of preparing the precursor mixture may comprise: (A) dispersing or exposing a laminar graphite material in a fluid of an intercalant and/or an oxidant to obtain a graphite intercalation compound (GIC) or graphite oxide (GO); (B) exposing the resulting GIC or GO to a thermal shock at temperature for a period of time sufficient to obtain exfoliated graphite or graphite worms; (C) dispersing the exfoliated graphite or graphite worms in a liquid medium containing an acid, an oxidizing agent, and/or an organic solvent at a desired temperature for a duration of time until the exfoliated graphite is converted into a graphene oxide dissolved in the liquid medium to form a graphene solution; and (D) adding a desired amount of said anode precursor material to the graphene solution to form the precursor mixture in a suspension, slurry or paste form.

Alternatively, the process may begin with the preparation of pristine graphene, instead of graphene oxide. In other words, the step of preparing the precursor mixture comprises: (a) preparing a suspension containing pristine nano graphene platelets (NGPs) dispersed in a liquid medium; (b) adding an acid and/or an oxidizing agent into the suspension at a temperature for a period of time sufficient to obtain a graphene solution or suspension; and (c) adding a desired amount of an anode active material or precursor in the graphene solution or suspension to form a paste or slurry.

Another embodiment of the present invention is a lithium ion battery anode comprising multiple nano graphene-enhanced anode particulates as described above. A further embodiment is a lithium ion battery comprising such an anode, a cathode, a separator disposed between the anode and the cathode, and electrolyte in physical contact with both the anode and the cathode.

In a particularly preferred embodiment, a lithium ion battery may comprise an anode featuring graphene-enhanced particulates of anode active particles and a cathode featuring graphene-enhanced cathode particulates as well. A cathode particulate is formed of a single graphene sheet or a plurality of graphene sheets and a plurality of fine cathode active material particles with a size smaller than 10 μm (preferably smaller than 1 μm and more preferably smaller than 100 nm). The graphene sheets and the particles are mutually bonded or agglomerated into the cathode particulate with at least a graphene sheet embracing the cathode active material particles inside the particulate. The graphene is in an amount of from 0.01% to 30% by weight based on the cathode particulate weight.

There is also no particular restriction on the type and nature of the cathode active material, which can be selected for practicing the present invention. The cathode active material may be selected from the group consisting of lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphates, metal sulfides, and combinations thereof When the graphene-enhanced anode particulate contains Si as an anode active material (preferably in a sub-micron or nano particle form), according to a preferred embodiment of the present invention, one can achieve a reversible specific capacity of greater than 1,000 mAh/g for longer than 500 cycles and, in many cases, even greater than 2,000 mAh/g, calculated on the basis of the total particulate anode weight. The anodes featuring these graphene-enhanced particulates also exhibit a high tap density. The embracing graphene sheets also appear to be capable of preventing the electrolyte from detrimentally reacting with the anode active material (otherwise, such a reaction is a major cause for the poor first-cycle efficiency). Equally importantly, the anode slurry, containing particulates and a binder (PVDF) dispersed in a solvent (NMP), has flow characteristics (viscosity, consistency, etc) that are conducive to the formation of electrodes using existing electrode-coating machines. This is not the case of those anode active particle-loaded graphene sheets reported by the prior art workers.

DETAILED DESCRIPTION OF PREFERRED EMBODIMENTS

This invention is related to electrode materials for the high-capacity lithium secondary battery, which is preferably a secondary battery based on a non-aqueous electrolyte or a polymer gel electrolyte. The shape of a lithium secondary battery can be cylindrical, square, button-like, etc. The present invention is not limited to any battery shape or configuration.

Figure 1:
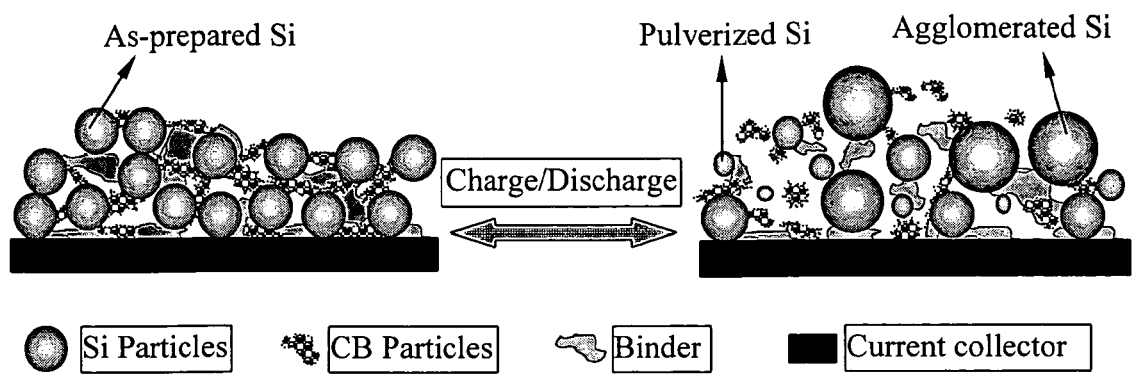
FIG. 1 is a schematic depiction of a prior art anode active material (e.g., Si particles) that tends to undergo pulverization during battery charge-discharge cycling.
Figure 2A:
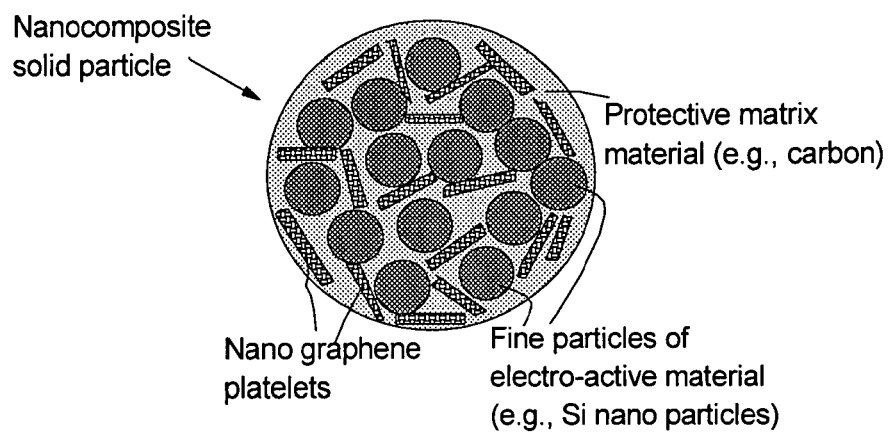
FIG. 2(A) depicts a spherical nanocomposite particle comprising electro-active materials (e.g., Si nano particles) and NGPs dispersed in a protective matrix (e.g., amorphous carbon)
Figure 2B:
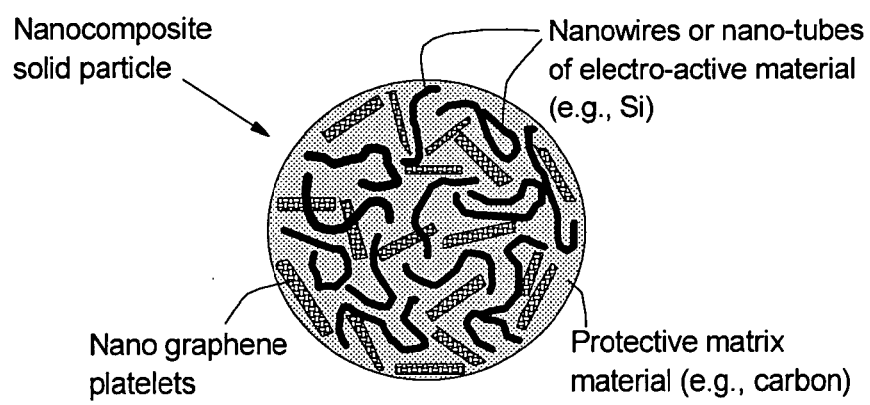
FIG. 2(B) depicts a spherical nanocomposite particle comprising electro-active materials (e.g., Si nano-wires) and NGPs dispersed in a protective matrix (e.g., amorphous carbon)
Figure 3:
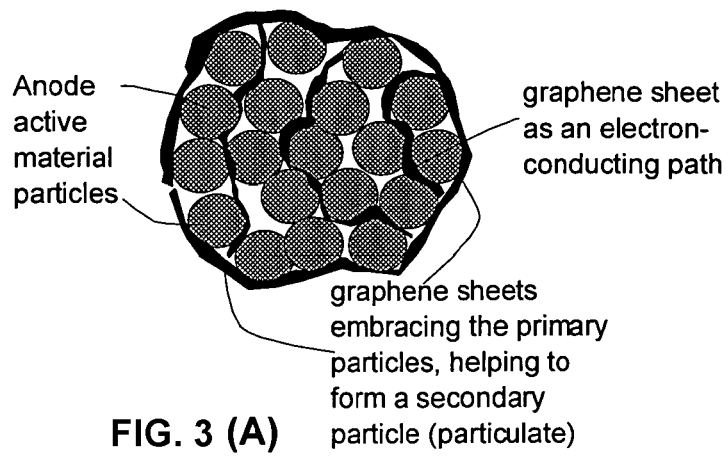
FIG. 3(A) depicts a schematic of a graphene-enhanced anode particulate according to a preferred embodiment of the present invention.
FIG. 3(B) depicts another particulate according to another preferred embodiment of the present invention (containing some amount of a carbon or graphite material)
Figure 3:
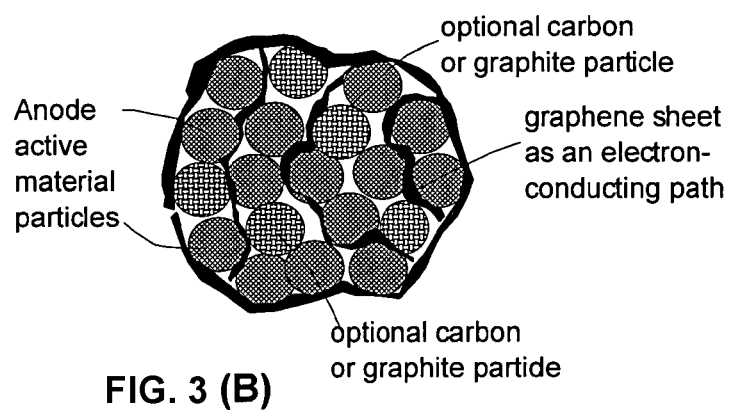

The present invention provides a nano graphene-enhanced particulate (secondary particle) for use as a lithium-ion battery anode material, wherein the particulate is formed of a single or a plurality of graphene sheets and a plurality of fine anode active material particles (primary particles, with a size smaller than 10 μm, preferably smaller than 1 μm, and most preferably smaller than 100 nm). The graphene sheets and the particles are mutually bonded or agglomerated into the particulate with at least a graphene sheet embracing the anode active material particles (FIG. 3(A)). FIG. 3(A) is a depiction of anode active material particles 302 that are surrounded by graphene sheets 304 that provide an electron-conducting path, where the graphene sheets embrace the primary particles, helping to form a secondary particle (particulate) 306. Graphene is in an amount of at least 0.01% by weight (preferably at least 0.1% by weight and more preferably at least 1% by weight, but typically less than 99% by weight) and the anode active material is in an amount of at least 0.1% by weight, all based on the total weight of the particulate. The particulate is approximately spherical or ellipsoidal in shape. The graphene material in or on this particulate preferably comprises single-layer graphene or few-layer graphene, wherein few-layer graphene is defined as a graphene platelet formed of less than 10 graphene planes of carbon atoms. In addition to an anode active material (e.g. Si particles), a carbon or graphite material may be added to the interior of the particulate (FIG. 3(B)). FIG. 3(B) shows anode active material particles 402 and optional carbon or graphite particles 404, and a graphene sheet as an electron-conducting path 406. This carbon or graphite material in a fine particle or thin coating form provides additional protection (additional electron-conducting paths, additional cushioning effect, and additional shielding against undesirable reactions with electrolyte). Graphite and carbon materials can also be an anode active material.

A nano graphene platelet (NGP) or nano graphene sheet is composed of one basal plane (graphene plane) or multiple basal planes stacked together in the thickness direction. In a graphene plane, carbon atoms occupy a 2-D hexagonal lattice in which carbon atoms are bonded together through strong in-plane covalent bonds. In the c-axis or thickness direction, these graphene planes may be weakly bonded together through van der Waals forces. An NGP can have a platelet thickness from less than 0.34 nm (single layer) to 100 nm (multi-layer). For the present electrode use, the preferred thickness is <10 nm and most preferably <3 nm or 10 layers). The presently invented graphene-enhanced particulate preferably contains mostly single-layer graphene, but could make use of some few-layer graphene (less than 10 layers). The graphene sheet may contain a small amount (typically <25% by weight) of non-carbon elements, such as hydrogen, fluorine, and oxygen, which are attached to an edge or surface of the graphene plane. Graphene was recently discovered to exhibit the highest thermal conductivity of all existing materials. In addition to the electrical conductivity, this high thermal conductivity is clearly an advantageous property that could not be achieved by any other type of conductive additives.

Graphene sheets may be oxidized to various extents during their preparation, resulting in graphite oxide (GO) or graphene oxide. Hence, in the present context, graphene preferably or primarily refers to those graphene sheets containing no or low oxygen content; but, they can include GO of various oxygen contents. Further, graphene may be fluorinated to a controlled extent to obtain graphite fluoride.

The NGPs may be obtained from exfoliation and platelet separation of a natural graphite, synthetic graphite, highly oriented pyrolytic graphite, graphite fiber, carbon fiber, carbon nano-fiber, graphitic nano-fiber, spherical graphite or graphite globule, meso-phase micro-bead, meso-phase pitch, graphitic coke, or graphitized polymeric carbon.

For anode applications, the electrode active material preferably comprises an anode active material selected from the group consisting of: (a) silicon (Si), germanium (Ge), tin (Sn), lead (Pb), antimony (Sb), bismuth (Bi), zinc (Zn), aluminum (Al), titanium (Ti), Nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements, wherein the alloys or compounds are stoichiometric or non-stoichiometric; (c) oxides, carbides, nitrides, sulfides, phosphides, selenides, and tellurides of Si, Ge, Sn, Ph, Sb, Bi, Zn, Al, Fe, Ti, Ni, Co, or Cd, and their mixtures or composites; and (d) combinations thereof There is essentially no constraint on the type and nature of the anode active material that can be used in practicing the present invention.

Figure 4A:
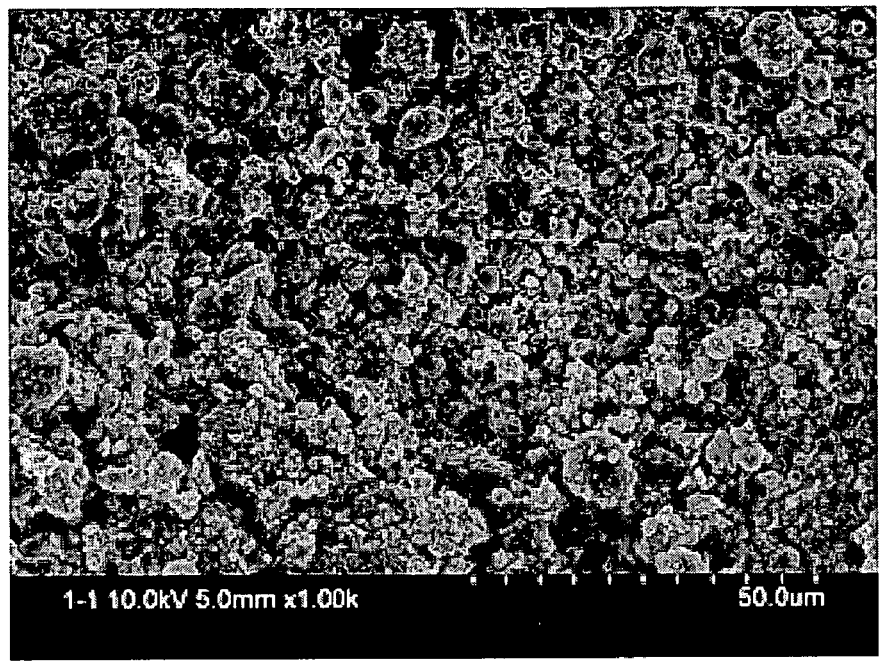
FIG. 4(A) is a SEM image of a simple mixture of primary Si particles and fine graphite particles without being embraced by graphene sheets.
Figure 4B:
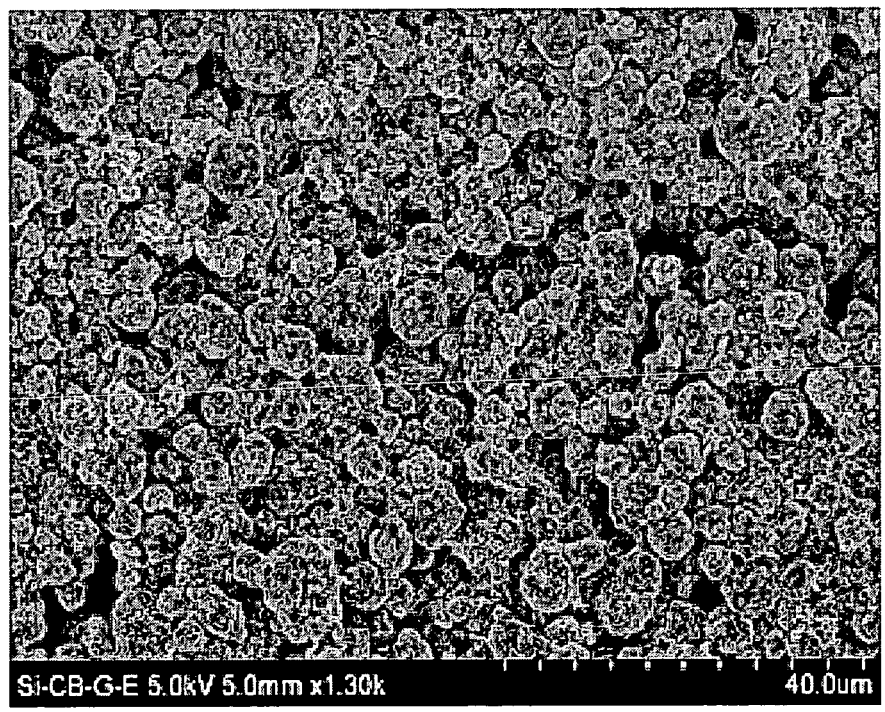
FIG. 4(B) is a SEM image of a graphene-enhanced particulates comprising graphene sheets inside the particulate and on the exterior surface of the particulate, according to one preferred embodiment of the present invention.
Figure 4C:
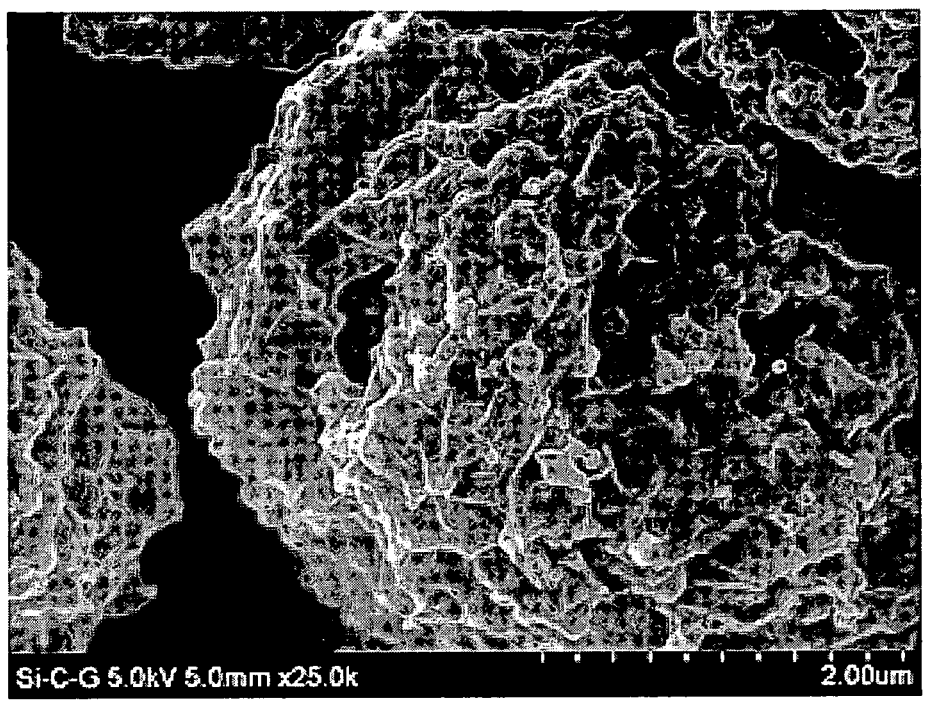
FIG. 4(C) is a higher-magnification SEM image of graphene-enhanced particulates. Graphene sheets embrace and protect the primary particles to form secondary particles (particulates) that are easier to handle in a real anode production environment. The embracing graphene sheets also prevent Si nano particles from chemically reacting with the electrolyte.

FIG. 4(A) shows an SEM image of a simple mixture of primary Si particles and fine graphite particles without being embraced by graphene sheets. In contrast, FIG. 4(B) and FIG. 4(C) show graphene-enhanced particulates comprising graphene sheets in and around the particulate. Graphene sheets embrace and protect the primary particles to form secondary particles (particulates) that are easier to handle in a real anode production environment. The embracing graphene sheets also prevent Si nano particles from chemically reacting with the electrolyte. The notion that the exterior surface is embraced with highly conductive graphene sheets implies that these sheets can naturally form a 3-D network of electron-conducting paths when multiple particulates are packed together in an anode.

Figure 5A:
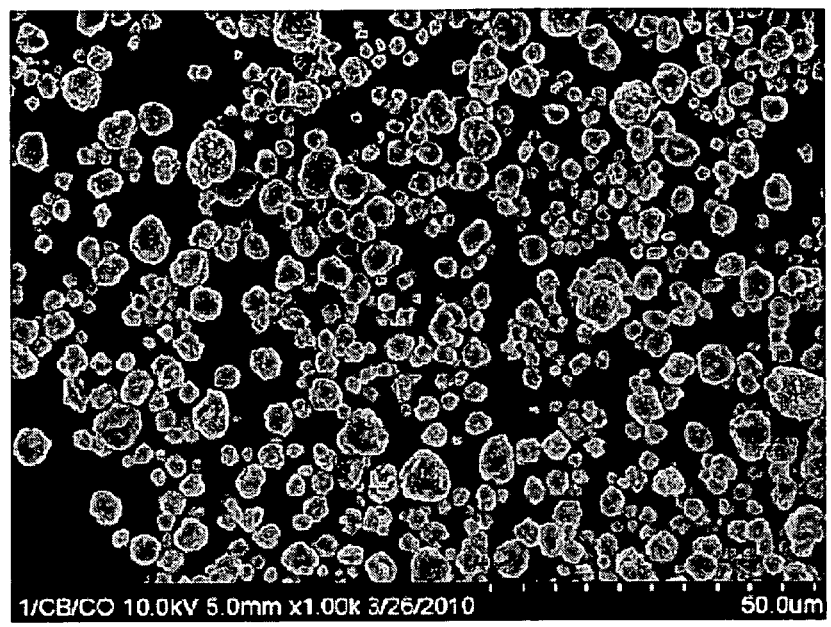
FIG. 5(A) depicts a lower-magnification image demonstrating uniform particle sized SEM image of graphene-enhanced particulates containing therein $Co_3O_4$ and carbon black particles embraced by graphene sheets.
Figure 5B:
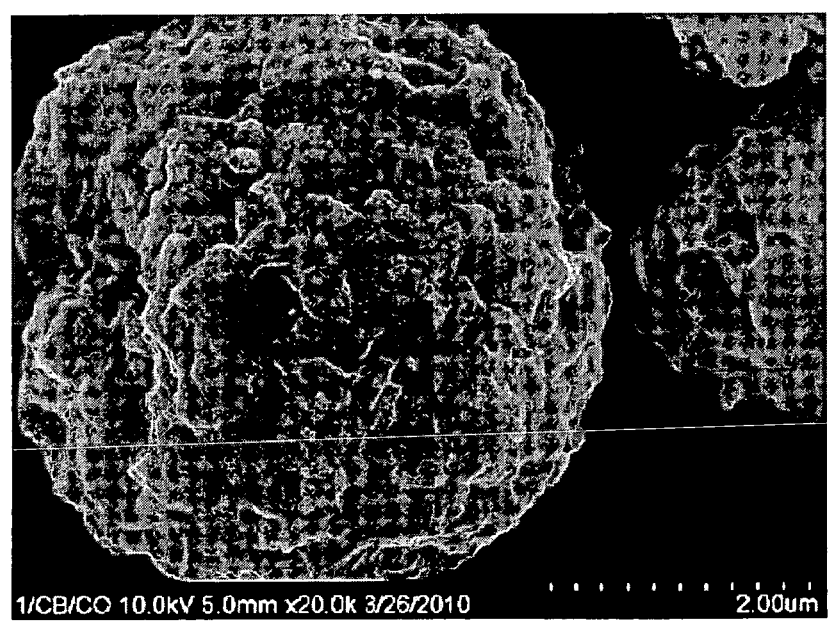
FIG. 5(B) depicts a higher-magnification SEM image demonstrating uniform particle sized SEM image of graphene-enhanced particulates containing therein $Co_3O_4$ and carbon black particles embraced by graphene sheets; We found that these more or less spherical particles can be easily handled and made into electrodes using existing battery electrode coating machines. No unusual or specialty equipment is required. The resulting electrodes also exhibit a high tap density.
Figure 6:
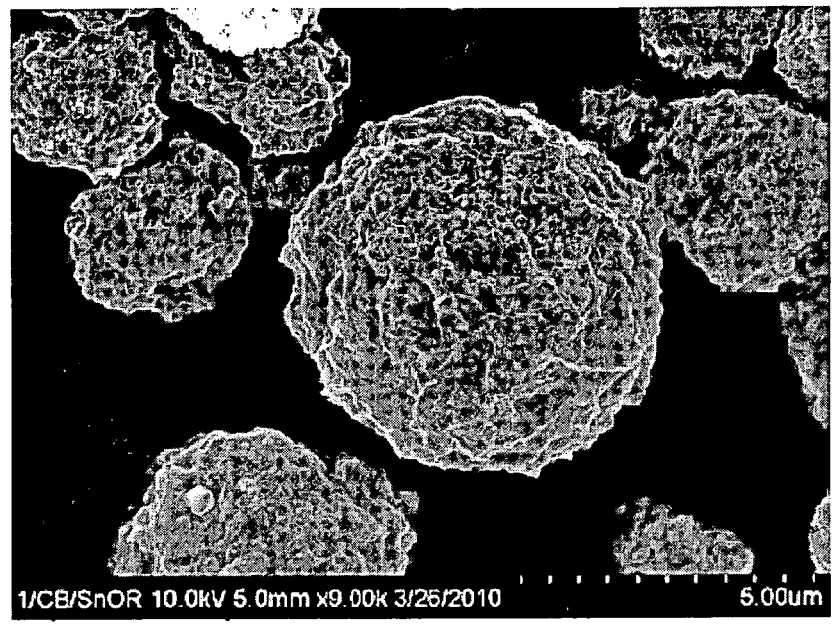
FIG. 6 is a SEM image of an anode particulate with tin oxide primary particles embraced by graphene sheets.

FIG. 5 shows SEM images of graphene-enhanced particulates containing therein $Co_3O_4$ and carbon black particles embraced by graphene sheets. FIG. 5(A), a lower-magnification image, demonstrates uniform sizes of graphene-enhanced particulates. FIG. 5(B), a higher-magnification SEM image, clearly shows the graphene sheets embracing therein primary particles. FIG. 6 shows an SEM micrograph of graphene-enhanced tin oxide particulates. Graphene sheets embrace and protect the primary particles to form secondary particles (particulates) that are more uniform in particle sizes and are larger in average size (~10 μm) than the primary particles. These more or less spherical particles can be easily handled and made into electrodes using existing battery electrode coating machines. These particulates were found to lead to anodes that have a higher tap density (weight per volume of the electrode), which is a very important parameter for an electrode.

One useful class of electrode active material particles (primary particles) is spherical or ellipsoidal in shape. For instance, most of the commercially available Si particles are spherical in shape. Another useful class of electro-active material particles is in the form of nanoscopic wire, also herein referred to as the nanoscopic-scale wire, nanoscale wire, or nanowire. At any point along its length, a nanowire has at least one cross-sectional dimension and, in some embodiments, two orthogonal cross-sectional dimensions less than about 500 nm, preferably less than about 200 nm, more preferably less than about 100 nm, and most preferably less than about 50 nm. Where nanoscale wires are described as having a core and an outer region, the above dimensions generally relate to those of the core. The cross-section of the nanoscale wire may have any arbitrary shape, including, but not limited to, circular, square, rectangular, tubular, or elliptical, and may have an irregular shape. For example, ZnO nanowires have a hexagonal cross-section, $SnO_2$ nanowires have a rectangular cross-section, PbSe nanowires have a square cross-section, and Si or Ge nanowires have a circular cross-section. Again, the term "diameter" is intended to refer to the average of the major and minor axis of the cross-section. The nanoscale wire may be solid or hollow. The length of the nanoscale wire is preferably at least 1 μm and more preferably at least 5 μm. The wires should have an aspect ratio (length to diameter) of at least about 2:1 and preferably greater than about 10:1.

As used herein, a nanotube (e.g. a carbon nanotube) is generally a nanoscopic wire that is hollow, or that has a hollowed-out core, including those nanotubes known to those of ordinary skill in the art. Nanotubes and nano rods may be considered as two special classes of small wires for use as the primary particles that can be embraced by graphene sheets to form particulates (secondary particles) in the invention.

Catalytic growth is a powerful tool to form a variety of wire- or whisker-like structures with diameters ranging from just a few nanometers to the micrometer range. A range of phases (gas, solid, liquid, solution, and supercritical fluid) have been used for the feeder phase, i.e. the source of material to be incorporated into the nano-wire. These material systems include Si nanowires (SiNW), heterojunctions between SiNW and CNT, $SiO_x$ (a sub-stoichiometric silicon oxide), $SiO_2$, $Si_{1-x}Ge_x$, Ge, AlN, $\gamma$-$Al_2O_3$, oxide-coated B, $CN_x$, CdO, CdS, CdSe, CdTe, $\alpha$-$Fe_2O_3$ (hematite), $\varepsilon$-$Fe_2O_3$ and $Fe_3O_4$ (magnetite), GaAs, GaN, $Ga_2O_3$, GaP, InAs, InN (hexangular structures), InP, $In_2O_3$, $In_2Se_3$, $SnO_2$, ZnO, ZnS, ZnSe, Mn doped $Zn_2SO_4$, and ZnTe. These nanowires can be used as anode active materials.

Likewise, there is essentially no constraint on the type and nature of the cathode active material provided the active material can be made into a fine particle form (e.g., a spherical particle, nano-wire, nano-fiber, nano-rod, or nano-tube) with a dimension smaller than 1 μm. For cathode applications, the electrode active material may comprise a cathode active material selected from the group consisting of lithium cobalt oxide, doped lithium cobalt oxide, lithium nickel oxide, doped lithium nickel oxide, lithium manganese oxide, doped lithium manganese oxide, lithium iron phosphate, lithium manganese phosphate, lithium vanadium oxide, doped lithium vanadium oxide, lithium vanadium phosphate, lithium transition metal phosphate, lithium mixed-metal phosphates, metal sulfides, metal phosphides, metal halogenides, and combinations thereof.

As a preferred embodiment, the process of producing graphene-enhanced particulates comprises (i) preparing a precursor mixture of graphene or graphene precursor with an anode active material or a precursor to the active material; and (ii) thermally and/or chemically converting the precursor mixture to the graphene-enhanced anode particulate. Described in more detail, the process entails:

(a) dispersing or immersing a laminar graphite material (e.g., graphite powder) in a mixture of an intercalant and an oxidant (e.g., concentrated sulfuric acid and nitric acid, respectively) to obtain a graphite intercalation compound (GIC) or graphite oxide (GO);

(b) exposing the resulting GIC or GO to a thermal shock, preferably in a temperature range of 600-1,100° C. for a short period of time (typically 15 to 60 seconds), to obtain exfoliated graphite or graphite worms; and (c) dispersing exfoliated graphite in a liquid (e.g. water) and mechanically separating individual nano graphene platelets or sheets from graphite worms using, for instance, a high-shear mixer or an ultrasonicator to obtain a graphene or graphene precursor suspension; or, alternatively, (d) re-dispersing the exfoliated graphite to a liquid medium containing an acid (e.g., sulfuric acid), an oxidizing agent (e. nitric acid), or an organic solvent (e.g., NMP) at a desired temperature for a duration of time until the exfoliated graphite is converted into graphene oxide or graphene dissolved in the liquid medium. The acid is preferably a weak acid (such as diluted sulfuric acid) or a more environmentally benign acid, such as formic acid, acetic acid, citric acid, carboxylic acid, and combinations thereof. The exfoliated graphite, when dispersed in these acids, was gradually dispersed and essentially dissolved to form a graphene or graphene oxide solution or suspension.

Although not a required operation, stirring, mechanical shearing, or ultrasonication can be used to accelerate the dispersion and dissolution step;

(e) dispersing an anode active material or a precursor to an anode active material to the graphene or graphene precursor solution or suspension prepared in step (c) or step (d) to obtain a precursor mixture suspension; and (f) thermally and/or chemically converting the precursor mixture to the graphene-enhanced anode particulate.

An optional, but desirable intermediate step between (e) and (f) involves drying the suspension to form the precursor mixture in a solid state. If the precursor mixture contains a precursor to an anode active material (e.g., $Co(OH)_2$ being a precursor to $Co_3O_4$ nano particles), the mixture will be thermally heated (sintered) to obtain the particulates that contain primary $Co_3O_4$ particles therein (e.g., at 300° C.). If the precursor mixture contains a precursor to graphene (e.g. graphene oxide), then the precursor may be subjected to a chemical or thermal oxidation. A heat treatment at a temperature of preferably 500-1,000° C. for 1-2 hours would serve to eliminate a majority of the oxygen content from the graphene sheets.

The carboxylic acid used in step (d) may be selected from the group consisting of aromatic carboxylic acid, aliphatic or cycloaliphatic carboxylic acid, straight chain or branched chain carboxylic acid, saturated and unsaturated monocarboxylic acids, dicarboxylic acids and polycarhoxylic acids that have 1-10 carbon atoms, alkyl esters thereof, and combinations thereof. Preferably, the carboxylic acid is selected from the group consisting of saturated aliphatic carboxylic acids of the formula $H(CH_2)_nCOOH$, wherein n is a number of from 0 to 5, including formic, acetic, propionic, butyric, pentanoic, and hexanoic acids, anydrides thereof, reactive carboxylic acid derivatives thereof, and combinations thereof. The most preferred carboxylic acids are formic acid and acetic acid.

In step (e), particles of a carbon or graphite material may be added along with the anode active material particles. Alternatively, the anode active material particles may be coated with a thin layer of carbon before they are mixed with the graphene suspension. For instance, micron-, sub-micron-, or nano-scaled Si nano particles may be mixed into a solution containing a carbon precursor (e.g. sugar in water or phenolic resin in a solvent). The liquid component is then removed from the resulting mixture suspension or paste to obtain sugar- or resin-coated Li particles. These coated particles are then heat-treated at a temperature of 500-1,000° C. to obtain carbon-coated particles. These particles are then added to the graphene solution or suspension.

Hence, another embodiment of the present invention is a process for preparing the presently invented graphene-enhanced anode particulate. In one preferred embodiment, the process comprises: (a) preparing a precursor mixture of graphene or graphene precursor with an anode active material or anode active material precursor; and (b) thermally and/or chemically converting the precursor mixture to the graphene-enhanced anode particulate. The step of preparing a precursor mixture may comprise preparing a suspension of graphene or graphene precursor (e.g. graphene oxide or graphene fluoride) in a liquid medium and mixing an anode active material or anode active material precursor in the suspension to form a multi-component suspension. The process may further comprise a step of drying the multi-component suspension to form the precursor mixture.

The step of drying the multi-component suspension to form the precursor mixture may be conducted using a spray-drying, spray-pyrolysis, fluidized-bed drying procedure, or any step that involves atomizing or aerosolizing the suspension. The step of converting may comprise a sintering, heat-treatment, spray-pyrolysis, or fluidized bed drying or heating procedure. The step of converting may comprise a procedure of chemically or thermally reducing the graphene precursor to reduce or eliminate oxygen or fluorine content and other non-carbon elements of the graphene precursor, which graphene precursor may contain graphene oxide or graphene fluoride. Upon conversion, the graphene in the particulate has an oxygen content typically less than 5% by weight.

As another preferred embodiment, the process may begin with the production of a precursor solution or suspension of pristine graphene (non-oxidized graphene) directly from graphite particles, which is followed by the addition of an anode active material or precursor to the anode active material to this solution or suspension to obtain a precursor mixture. The production of a precursor solution or suspension may include the following steps:

(a) Preparing a suspension containing pristine nano graphene platelets (NGPs) dispersed in a liquid medium using, for instance, direct ultrasonication (e.g., a process disclosed by us in U.S. patent application Ser. No. 11/800,728 (May 8, 2007));

(b) Optionally removing some of the liquid from the suspension;

(c) Adding a desired amount of an anode active material or a precursor to an anode active material to obtain a precursor mixture suspension or solution;

(d) Removing the liquid from the suspension to obtain a precursor mixture solid; and (e) Thermally and/or chemically converting the precursor mixture solid to the graphene-enhanced anode particulate.

For the preparation of an anode, multiple graphene-enhanced particulates are mixed with a binder solution (e.g., PVDF in NMP) to obtain a slurry or paste. A desired amount of the slurry or paste is then coated onto a current collector, allowing the liquid to evaporate and leaving behind an electrode bonded to a surface of a current electrode. For examples, particulates containing Si and graphite particles embraced by graphene sheets may be added to a solution containing a solvent (NMP). The resulting paste may be coated onto a copper foil as a current collector to form a coating layer of 50-500 µm thick. By allowing the solvent to vaporize one obtains a negative electrode (anode) for a lithium-ion battery.

In the aforementioned examples, the starting material for the preparation of NGPs is a graphitic material that may be selected from the group consisting of natural graphite, artificial graphite, graphite oxide, graphite fluoride, graphite fiber, carbon fiber, carbon nano-fiber, carbon nano-tube, mesophase carbon micro-head (MCMB) or carbonaceous micro-sphere (CMS), soft carbon, hard carbon, and combinations thereof.

Graphite oxide may be prepared by dispersing or immersing a laminar graphite material (e.g., powder of natural flake graphite or synthetic graphite) in an oxidizing agent, typically a mixture of an intercalant (e.g., concentrated sulfuric acid) and an oxidant (e.g., nitric acid, hydrogen peroxide, sodium perchlorate, potassium permanganate) at a desired temperature (typically 0-70° C.) for a sufficient length of time (typically 30 minutes to 5 days). In order to reduce the time required to produce a precursor solution or suspension, one may choose to oxidize the graphite to some extent for a shorter period of time (e.g., 30 minutes) to obtain graphite intercalation compound (GIC). The GIC particles are then exposed to a thermal shock, preferably in a temperature range of 600-1,100° C. for typically 15 to 60 seconds to obtain exfoliated graphite or graphite worms, which are optionally (but preferably) subjected to mechanical shearing (e.g. using a mechanical shearing machine or an ultrasonicator) to break up the graphite flakes that constitute a graphite worm. The un-broken graphite worms or individual graphite flakes are then re-dispersed in water, acid, or organic solvent and ultrasonicated to obtain a graphene polymer solution or suspension.

The pristine graphene material is preferably produced by one of the following three processes: (A) Intercalating the graphitic material with a non-oxidizing agent, followed by a thermal or chemical exfoliation treatment in a non-oxidizing environment; (B) Subjecting the graphitic material to a supercritical fluid environment for inter-graphene layer penetration and exfoliation; or (C) Dispersing the graphitic material in a powder form to an aqueous solution containing a surfactant or dispersing agent to obtain a suspension and subjecting the suspension to direct ultrasonication.

In Procedure (A), a particularly preferred step comprises (i) intercalating the graphitic material with a non-oxidizing agent, selected from an alkali metal (e.g., potassium, sodium, lithium, or cesium), alkaline earth metal, or an alloy, mixture, or eutectic of an alkali or alkaline metal; and (ii) a chemical exfoliation treatment (e.g., by immersing potassium-intercalated graphite in ethanol solution).

In Procedure (B), a preferred step comprises immersing the graphitic material to a supercritical fluid, such as carbon dioxide (e.g., at temperature T>31° C. and pressure P>7.4 MPa) and water (e.g., at T>374° C. and P>22.1 MPa), for a period of time sufficient for inter-graphene layer penetration (tentative intercalation). This step is then followed by a sudden depressurization to exfoliate individual graphene layers. Other suitable supercritical fluids include methane, ethane, ethylene, hydrogen peroxide, ozone, water oxidation (water containing a high concentration of dissolved oxygen), or a mixture thereof.

In Procedure (C), a preferred step comprises (a) dispersing particles of a graphitic material in a liquid medium containing therein a surfactant or dispersing agent to obtain a suspension or slurry; and (b) exposing the suspension or slurry to ultrasonic waves (a process commonly referred to as ultrasonication) at an energy level for a sufficient length of time to produce the separated nano-scaled platelets, which are pristine, non-oxidized NGPs.

NGPs can be produced with an oxygen content no greater than 25% by weight, preferably below 20% by weight, further preferably below 5%. Typically, the oxygen content is between 5% and 20% by weight. The oxygen content can be determined using chemical elemental analysis and/or X-ray photoelectron spectroscopy (XPS).

The resulting suspension can be converted into micron-scaled droplets (particulates) using several approaches. For instance, the suspension may be aerosolized or atomized to form fine aerosol particles. Concurrently or subsequently, the liquid or solvent is removed to form solid particles that are typically spherical or ellipsoidal in shape with a diameter or major axis typically less than 10. This procedure may be executed by using an aerosol generation, atomization, spray drying, or inkjet printing apparatus. As an optional but preferred procedure, the solid particles are simultaneously or subsequently subjected to a pyrolysis or carbonization treatment to convert the organic or polymeric material, if existing, into a carbon material. The heat treatment of petroleum or coal-based heavy oil or pitch will serve to convert at least part of the oil or pitch into a meso-phase, an optically anisotropic or liquid crystalline phase of a fused aromatic ring structure. The converted pitch is called a meso-phase pitch. Since NGPs are essentially pure graphite-based or graphene materials, this low temperature heat treatment (350-1,200° C.) has no adverse effect on the NGP structure. Essentially, one can use a spray pyrolysis technique, such as ultrasonic spray pyrolysis or electro-spray pyrolysis, to accomplish both the aerosol generation and pyrolysis procedures Another embodiment of the present invention is a lithium ion battery anode comprising multiple nano graphene-enhanced anode particulates as described above. A further embodiment is a lithium ion battery comprising such an anode, a cathode, a separator disposed between the anode and the cathode, and electrolyte in physical contact with both the anode and the cathode.

In a particularly preferred embodiment, a lithium ion battery may comprise an anode featuring graphene-enhanced particulates of anode active particles and a cathode featuring graphene-enhanced cathode particulates as well. A cathode particulate is formed of a single graphene sheet or a plurality of graphene sheets and a plurality of fine cathode active material particles with a size smaller than 10 μm (preferably smaller than 1 μm and more preferably smaller than 100 nm). The graphene sheets and the particles are mutually bonded or agglomerated into the cathode particulate with at least a graphene sheet embracing the cathode active material particles. The graphene is in an amount of from 0.01% to 30% by weight based on the cathode particulate weight. Such graphene-enhanced cathode particulates may be produced by the processes similar to those described above for the production of graphene-enhanced anode particulates.

There is also no particular restriction on the type and nature of the cathode active material, which can be selected for practicing the present invention. The cathode active material may be selected from the group consisting of lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphates, metal sulfides, and combinations thereof.

The positive electrode active material may also be selected from chalcogen compounds, such as titanium disulfate or molybdenum disulfate. More preferred are lithium cobalt oxide (e.g., $Li_xCoO_2$ where $0.8 \leq x \leq 1$), lithium nickel oxide (e.g., $LiNiO_2$) and lithium manganese oxide (e.g., $LiMn_2O_4$ and $LiMnO_2$) because these oxides provide a high cell voltage. Lithium iron phosphate is also preferred due to its safety feature and low cost. All these cathode active substances can be prepared in the form of a fine powder, nano-wire, nano-rod, nano-fiber, or nano-tube. They can be readily mixed with NGPs to form graphene-enhanced particulates. Acetylene black, carbon black, or ultra-fine graphite particles may be used as an additional conductor additive.

For the preparation of a cathode, the binder may be chosen from polytetrafluoroethylene (PTFE), polyvinylidene fluoride (PVDF), ethylene-propylene-diene copolymer (EPDM), or styrene-butadiene rubber (SBR), for example. Conductive materials such as electronically conductive polymers, meso-phase pitch, coal tar pitch, and petroleum pitch may also be used. Preferable mixing ratio of these ingredients may be 90 to 98% by weight for the particulates, and 2 to 10% by weight for the binder. The current collector may be selected from aluminum foil, stainless steel foil, and nickel foil. There is no particularly significant restriction on the type of current collector, provided the material is a good electrical conductor and relatively corrosion resistant. The separator may be selected from a synthetic resin nonwoven fabric, porous polyethylene film, porous polypropylene film, or porous PTFE film.

A wide range of electrolytes can be used for practicing the instant invention. Most preferred are non-aqueous and polymer gel electrolytes although other types can be used. The non-aqueous electrolyte to be employed herein may be produced by dissolving an electrolytic salt in a non-aqueous solvent. Any known non-aqueous solvent which has been employed as a solvent for a lithium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate and whose donor number is 18 or less (hereinafter referred to as a second solvent) may be preferably employed. This non-aqueous solvent is advantageous in that it is (a) stable against a negative electrode containing a carbonaceous material well developed in graphite structure; (b) effective in suppressing the reductive or oxidative decomposition of electrolyte; and (c) high in conductivity. A non-aqueous electrolyte solely composed of ethylene carbonate (EC) is advantageous in that it is relatively stable against decomposition through a reduction by a graphitized carbonaceous material. However, the melting point of EC is relatively high, 39 to 40° C., and the viscosity thereof is relatively high, so that the conductivity thereof is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage.

Preferable second solvents are dimethyl carbonate (DMC), methylethyl carbonate (MEC), diethyl carbonate (DEC), ethyl propionate, methyl propionate, propylene carbonate (PC), .gamma.-butyrolactone (.gamma.-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C.

The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

Examples of preferred mixed solvent are a composition comprising EC and MEC; comprising EC, PC and MEC; comprising EC, MEC and DEC; comprising EC, MEC and DMC; and comprising EC, MEC, PC, and DEC; with the volume ratio of MEC being controlled within the range of 30 to 80%. By selecting the volume ratio of MEC from the range of 30 to 80%, more preferably 40 to 70%, the conductivity of the solvent can be improved. With the purpose of suppressing the decomposition reaction of the solvent, an electrolyte having carbon dioxide dissolved therein may be employed, thereby effectively improving both the capacity and cycle life of the battery. The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$) and bis-trifluoromethyl sulfonylimide lithium [$LiN(CF_3SO_2)_2$]. Among them, $LiPF_6$, $LiBF_4$ and $LiN(CF_3SO_2)_2$ are preferred. The content of aforementioned electrolytic salts in the non-aqueous solvent is preferably 0.5 to 2.0 mol/l.

The following examples serve to illustrate the best mode practice of the present invention and should not be construed as limiting the scope of the invention, which is defined in the claims.

EXAMPLE 1

Graphene Oxide from Sulfuric Acid Intercalation and Exfoliation of MCMBs

MCMB 2528 meso-carbon microbeads were supplied by Alumina Trading, which was the U.S. distributor for the supplier, Osaka Gas Chemical Company of Japan. This material has a density of about 2.24 $g/cm^3$ with a median particle size of about 22.5. MCMB 2528 (10 grams) were intercalated with an acid solution (sulfuric acid, nitric acid, and potassium permanganate at a ratio of 4:1:0.05) for 48 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was neutral. The slurry was dried and stored in a vacuum oven at 60° C. for 24 hours. The dried powder sample was placed in a quartz tube and inserted into a horizontal tube furnace pre-set at a desired temperature, 800° C. for 30 seconds to obtain Sample 1. A small quantity of each sample was mixed with water and ultrasonicated at 60-W power for 10 minutes to obtain a suspension. A small amount was sampled out, dried, and investigated with TEM, which indicated that most of the NGPs were between 1 and 10 layers. The graphene-water suspension was used for subsequent preparation of a precursor mixture containing primary particles of either an anode active material or a cathode active material.

EXAMPLE 2

Oxidation and Exfoliation of Natural Graphite

Graphite oxide was prepared by oxidation of graphite flakes with sulfuric acid, sodium nitrate, and potassium permanganate at a ratio of 4:1:0.05 at 30° C. for 48 hours, according to the method of Hummers [U.S. Pat. No. 2,798, 878, Jul. 9, 1957]. Upon completion of the reaction, the mixture was poured into deionized water and filtered. The sample was then washed with 5% HCl solution to remove most of the sulfate ions and residual salt and then repeatedly rinsed with deionized water until the pH of the filtrate was approximately 7. The intent was to remove all sulfuric and nitric acid residue out of graphite interstices. The slurry was dried and stored in a vacuum oven at 60° C. for 24 hours.

The dried, intercalated (oxidized) compound was exfoliated by placing the sample in a quartz tube that was inserted into a horizontal tube furnace pre-set at 1,050° C. to obtain highly exfoliated graphite. The exfoliated graphite was dispersed in water along with a 1% surfactant at 45° C. in a flat-bottomed flask and the resulting graphene oxide (GO) suspension was subjected to ultrasonication for a period of 15 minutes.

EXAMPLE 3

Preparation of Graphene-Enhanced Anode Particulates

For the preparation of graphene-enhanced particulates, an amount of a selected electrode active material powder was added to a desired amount of GO suspension to form a precursor mixture suspension with a solid content of approximately 10% by weight. After thorough mixing in an ultrasonication reactor, the suspension was then spray-dried to form the graphene-enhanced particulates.

The anode active materials studied in this example include Si nano particles, particles of $Co_3O_4$, Sn, and SnO. The cathode active materials studied in this example include lithium cobalt oxide, lithium iron phosphate, and lithium mixed metal phosphate in a fine particle form.

EXAMPLE 4

Graphene-Enhanced Cobalt Oxide ($Co_3O_4$) Anode Particulates Versus $Co_3O_4$-Coated Graphene Sheets (Prior-Art Layered Composites)

Figure 7:
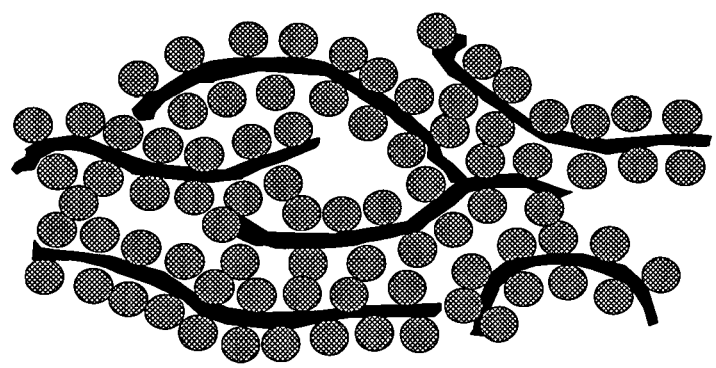
FIG. 7(A) depicts a schematic of prior art layered $Co_3O_4$/graphene composites.
FIG. 7(B) depicts presently invented graphene-enhanced particulates.
Figure 7:
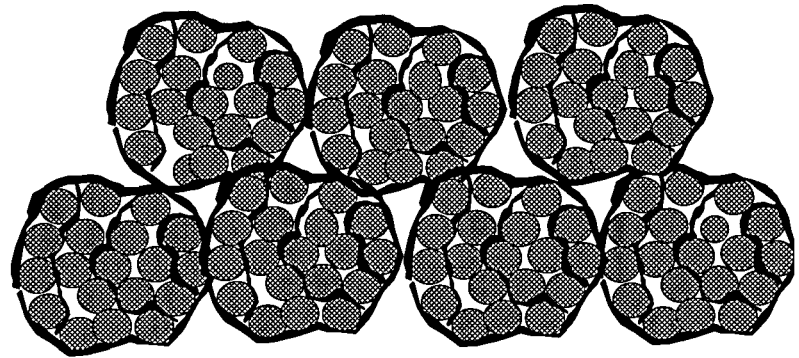

An appropriate amount of inorganic salts $Co(NO_3)_2.6H_2O$ and, subsequently, ammonia solution ($NH_3.H_2O$, 25 wt %) were slowly added into a suspension prepared in Example 2. The resulting precursor suspension was stirred for several hours under an argon flow to ensure a complete reaction. The obtained $Co(OH)_2$/graphene precursor suspension was divided into two portions. One portion was filtered and dried under vacuum at 70° C. to obtain a $Co(OH)_2$/graphene composite precursor. This precursor was calcined at 450° C. in air for 2 h to form the layered $Co_3O_4$/graphene composites, which are characterized by having $Co_3O_4$-coated graphene sheets overlapping one another (schematically shown in FIG. 7(A)).

The second portion was then atomized and spray-dried to obtain spherical $Co(OH)_2$/graphene particulates. These precursor particulates were calcined at 450° C. in air for 2 h to obtain the presently invented graphene-enhanced anode particulates (FIGS. 5(A) and (B)).

According to the starting graphene weight and the final total weight, the weight content of graphene (wt %) in the $Co_3O_4$/graphene composites was found to be about ~41.4%. For comparison, $Co_3O_4$ particles were also prepared without graphene by using the same procedure.

For electrochemical testing, the working electrodes were prepared by mixing 85 wt % active material (graphene-enhanced particulates, layered $Co_3O_4$/graphene composites, and $Co_3O_4$, separately), 7 wt % acetylene black (Super-P), and 8 wt % polyvinylidene fluoride (PVDF, 5 wt % solid content) binder dissolved in N-methyl-2-pyrrolidinoe (NMP). After coating the slurries on Cu foil, the electrodes were dried at 120° C. in vacuum for 2 h to remove the solvent before pressing. Then, the electrodes were cut into a disk ($\varphi$=12mm) and dried at 100° C. for 24 h in vacuum. Electrochemical measurements were carried out using CR2032 (3V) coin-type cells with lithium metal as the counter/reference electrode, Celgard 2400 membrane as separator, and 1 M $LiPF_6$ electrolyte solution dissolved in a mixture of ethylene carbonate (EC) and diethyl carbonate (DEC) (EC-DEC, 1:1 v/v). The cell assembly was performed in an argon-filled glove-box. The CV measurements were carried out using a CH-6 electrochemical workstation at a scanning rate of 1 mV/s.

Figure 8:
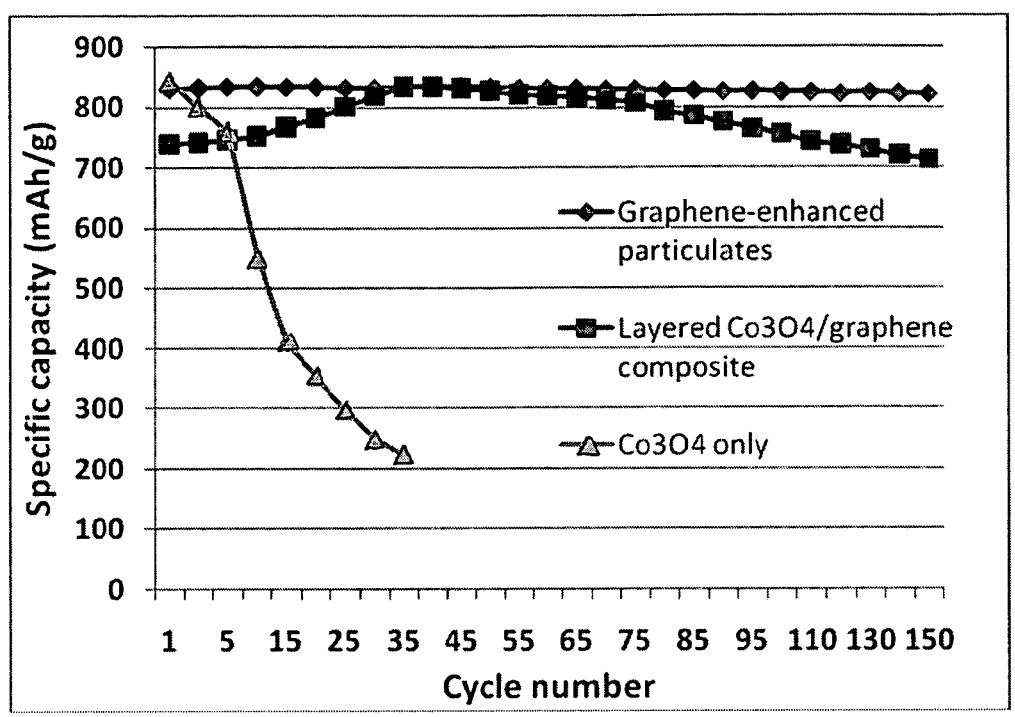
FIG. 8 is a graph depicting charge-discharge cycling behaviors of battery cells having an anode featuring graphene-enhanced particulates, layered $Co_3O_4$/graphene composites, and bare $Co_3O_4$ particles, respectively.

The electrochemical performance of graphene-enhanced particulates, layered $Co_3O_4$/graphene composites, and $Co_3O_4$ was also evaluated by galvanostatic charge/discharge cycling at a current density of 50 mA/g, using a LAND electrochemical workstation. The results indicate that the charge/discharge profiles for the graphene-enhanced particulate, $Co_3O_4$/graphene composite, and $Co_3O_4$ electrodes show a long voltage plateau at about 1.06 V, 1.06 V, and 1.10 V, respectively, followed by a slopping curve down to the cut-off voltage of 0.01 V, indicative of typical characteristics of voltage trends for the $Co_3O_4$ electrode. The first lithium insertion capacity is 915, 975, and 1,055 mAh/g, respectively, which are higher than the theoretical values of $Co_3O_4$ (890 mAh/g) and graphite (372 mAh/g). A high reversible charging capacity of ~831 mAh/g for graphene-enhanced particulates, ~753 mAh/g for layered $Co_3O_4$/graphene composite, and 817 mAh/g for $Co_3O_4$ was observed (FIG. 8). The initial capacity loss might have resulted from the incomplete conversion reaction and partially irreversible lithium loss due to the formation of solid electrolyte interface (SET) layers. As the number of cycles increases, the specific capacity of the bare $Co_3O_4$ electrode drops precipitously. The capacity of the layered $Co_3O_4$/graphene composite sample initially increases, but gradually decreases after approximately 40 charge/discharge cycles. Compared with its peak value of approximately 835 mAh/g, its capacity suffers a 14% loss after 150 cycles. By contrast, the presently invented graphene-enhanced particulates provide the battery cell with a very stable and high specific capacity for a large number of cycles, experiencing a capacity loss of less than 2% after 150 cycles (compared with its peak value of 835 mAh/g). These data have clearly demonstrated the surprising and superior performance of the presently invented graphene-enhanced particulate electrode materials compared with prior art graphene composites.

Another surprising feature of the graphene-enhanced particulates is their ability to be packed into a dense-mass electrode. Their tap density was found to be approximately 1.28 $g/cm^3$, as opposed to the approximately 0.98 $g/cm^3$ of the layered $Co_3O_4$/graphene composite electrode. This implies that the presently invented electrode not only provides a higher lithium storage capacity per unit mass, but also a higher mass per unit electrode volume. This is a very significant advantage in a real battery design and production environment.

EXAMPLE 5

Graphene-Enhanced Tin Oxide Particulates and Layered SnO$_2$/Graphene Composite Anodes Tin oxide (SnO$_2$) nano particles were obtained by the controlled hydrolysis of SnCl$_4$.5H$_2$O with NaOH using the following procedure: SnCl$_4$.5H$_2$O (0.95 g, 2.7 m-mol) and NaOH (0.212 g, 5.3 m-mol) were dissolved in 50 mL of distilled water each. The NaOH solution was added dropwise under vigorous stirring to the tin chloride solution at a rate of 1 mL/min. This solution was homogenized by sonication for 5 min. Subsequently, the resulting hydrosol was reacted with the NGP dispersion prepared in Example 1 for 3 hours.

Preparation of tin oxide-coated graphene sheets: To this mixed solution, few drops of 0.1 M of H$_2$SO$_4$ were added to flocculate the product. The precipitated solid was collected by centrifugation, washed with water and ethanol, and dried in vacuum. The dried product was heat-treated at 400° C. for 2 h under Ar atmosphere.

Preparation of graphene-enhanced particulates: To this mixed solution, some acetylene black (Super-P) particles were added to form a precursor mixture suspension. This mixture suspension was atomized and spray-dried to form particulates, which were heat-treated at 400° C. for 2 h under Ar atmosphere to obtain the final anode material (FIG. 6). The acetylene black content was approximately 9.4% by weight and graphene was 6.3% in the particulate.

The battery cells from the graphene-enhanced particulates (containing nano-scaled SnO$_2$ and acetylene black particles) and the prior art SnO$_2$-coated graphene sheets (layered composites) were prepared using a procedure described in Example 4. However, no additional conductive additive was added to the anode containing the presently invented graphene-enhanced particulates since 9.4% of Super-P had been pre-incorporated in these particulates. The layered composite-based anode does contain approximately 10% Super-P. The testing methods were also similar to those used in Example 4.

Figure 9:
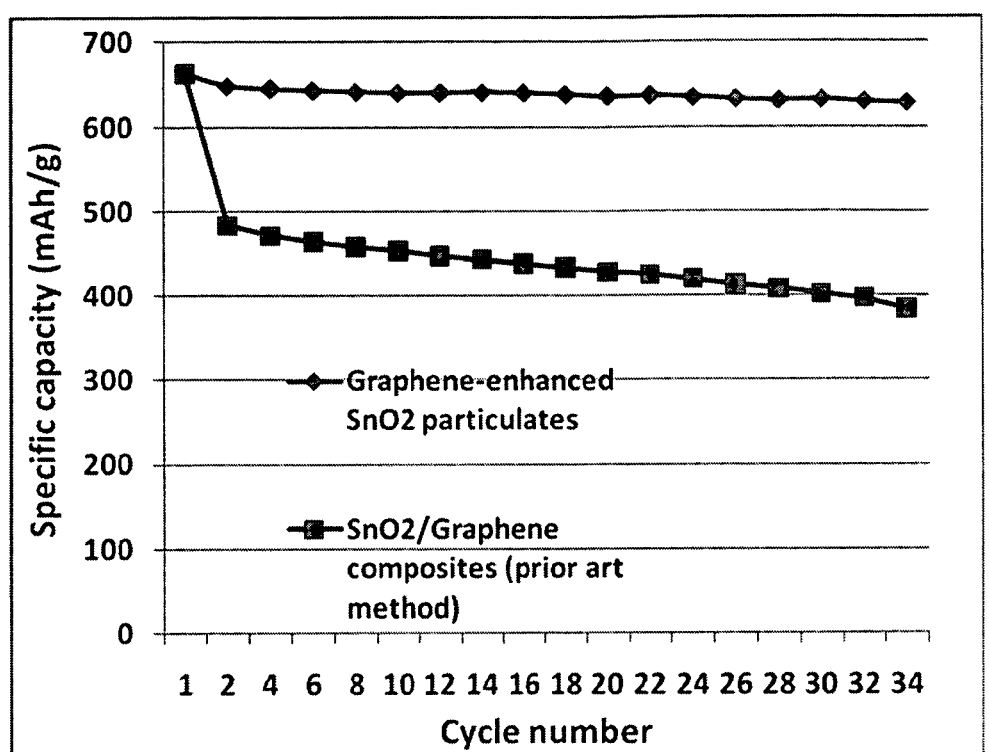
FIG. 9 is a graph depicting cycling behaviors of graphene-enhanced $SnO_2$ particulates of the present invention and $SnO_2$-graphene composites prepared according to a prior art method.

FIG. 9 shows that the anode prepared according to the presently invented grapheme-enhanced particulate approach offers a significantly more stable and higher reversible capacity compared to the SnO$_2$/graphene composite prepared according to a prior art method [Ref. 13]. Further to our surprise, the first-cycle efficiency of our anode is approximately 97.7% as opposed to the 73% efficiency of the corresponding composite electrode prepared by using a prior art method.

EXAMPLE 6

Si Nanowire-Based Graphene-Enhanced Particulates

In a typical procedure, approximately 2.112 g of silicon powders (average diameter 2.64 µm) were mixed with 80 ml of a 0.1M aqueous solution of Ni(NO$_3$).6H$_2$O and vigorously stirred for 30 min. Then, water was evaporated in a rotary evaporator and the solid remnants were completely dried in an oven at 150° C. The final sample (Ni-impregnated Si powers) was obtained by grinding the solids in a mortar.

Subsequently, 0.03 g of Ni-impregnated Si particles was placed in a quartz boat, and the boat was placed in a tube furnace. The sample was reduced at 500° C. for 4 hours under flowing Ar (180 sccm) and H$_2$ (20 sccm), then the temperature was raised to 990° C. to synthesize Si nanowires.

For the purpose of separating Si nanowires, for instance, every 0.1 g of the reacted Si powders was mixed with 10 ml of ethanol and the resulting mixture was sonicated for 1 hour. Subsequently, Si nanowires were separated from the Si powders by centrifuge at 5,000 rpm for 10 min.

Si nanowires were then mixed with controlled amounts of expanded graphite particles (thickness<70 nm), and few-layer graphene in a suspension prepared in Example 1 to form precursor mixture suspensions. These suspensions were fed into a laboratory scale spray drier equipped with an atomizer head. This procedure produced relatively spherical graphene-embraced solid particulates that are typically micron-scaled with a relatively narrow particle size distribution. Each solid particulate was composed of three components: Si nanowires, graphene sheets, and fine graphite particles embraced by graphene sheets. The final composition consists of approximately 48% Si nanowires, 12% NOPs, and 40% fine graphite particles.

EXAMPLE 7

Graphene-Embraced Lithium Iron Phosphate Particulates for the Cathode

Lithium iron phosphate LiFePO$_4$ is a promising candidate cathode material in lithium-ion batteries for electric vehicle applications. The advantages of LiFePO$_4$ as a cathode active material includes a high theoretical capacity (170 mAh/g), environmental benignity, low resource cost, good cycling stability, high temperature capability, and prospect for a safer cell compared with LiCoO$_2$. The major drawback with this material has been low electronic conductivity, on the order of $10^{-9}$ S/cm$^2$. This renders it difficult to prepare cathodes capable of operating at high rates. In addition, poor solid-phase transport means that the utilization of the active material is a strong function of the particle size. The presently invented particulate approach overcomes this major problem by using nano-scaled LiFePO$_4$ particles (to reduce the Li ion diffusion path and electron transport path distance) mixed with graphene sheets and carbon powder with all these ingredients embraced by graphene sheets.

Carbon-coated lithium iron phosphate (LiFePO$_4$) particles were dispersed in a graphene precursor solution prepared in Example 2 with a solid content of approximately 10% by weight. After thorough mixing in an ultrasonication reactor, the suspension was then spray-dried to form the graphene-enhanced cathode particulates (89% LiFePO$_4$, 6.8% carbon, and 4.2% graphene).

EXAMPLE 8

A Battery Cell with a Graphene-Enhanced Particulate Anode and a Graphene-Enhanced Particulate Cathode A battery cell (Cell-8) was made of an anode composed of graphene-enhanced Si particulates prepared in Example 6 (but with 23% by weight of Si nano-wires, 12% graphene, and 65% fine graphite particles) and a particulate cathode composed of the graphene-enhanced carbon-coated LiFePO$_4$ particles prepared in Example 7, separated by a porous separator and a liquid electrolyte specified in Example 4. For comparison purposes, two similarly made cells of comparable capacities were prepared and evaluated:

(a) CC-1 containing a graphene-enhanced anode (23% Si nano wires, 12% graphene, and 65% fine graphite particles), but a cathode of 90% by wt. LiFePO$_4$ and 10% by wt. Super-P; (b) CC-2 containing an anode of 23% by wt. of Si nano wires and 77% by wt. fine graphite particles and a cathode prepared in Example 7. All the electrodes have a PVDF binder content of 6%.

Figure 10:
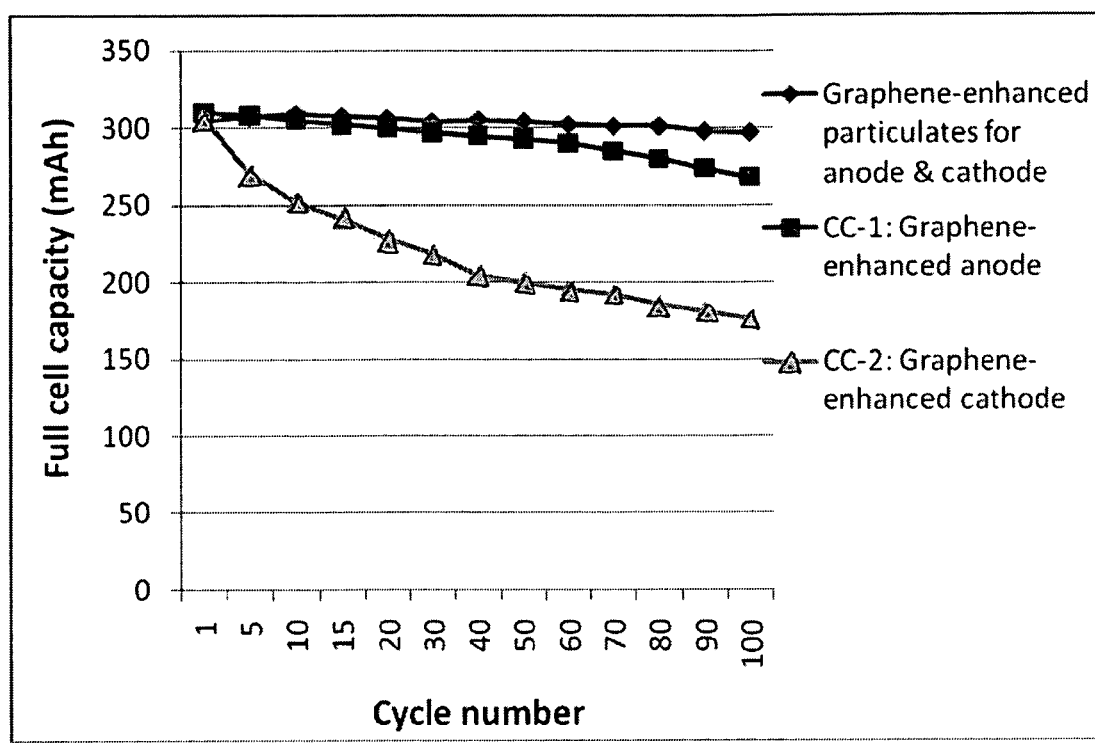
FIG. 10 is a graph depicting the capacity decay curves of three pouch cells: Cell-8 (both the anode and the cathode featuring graphene-enhanced particulates), CC-1 (only the anode featuring graphene-enhanced particulates), and CC-2 (only the cathode featuring graphene-enhanced particulates).

The capacity decay curves of these three pouch cells (Cell-8, CC-1, and CC-2) are shown in FIG. 10. These data demonstrate that a cell with both the anode and cathode being composed of the graphene-enhanced particulates exhibits the most stable cycling behavior. This is followed by a comparative cell with the anode being composed of the graphene-enhanced particulates, but the cathode is composed of 90% by wt of LiFePO$_4$ and 10% by wt. Super-P. The worse case is CC-2 wherein the anode does not have the benefit of being enhanced and protected by graphene sheets. Si nano particles (including nanowires) are known to undergo a huge volume change (up to >300%) during the charge/discharge cycles. Graphene-enhanced particulates effectively address this issue.

In conclusion, we have successfully developed a new and novel class of graphene-enhanced particulate anode and cathode materials that are superior lithium battery electrode materials. Such a graphene-enhanced particulate platform technology has the following highly desirable features and advantages:

(1) Graphene sheets are of high strength, high electrical conductivity, and high thermal conductivity. Single layer graphene was recently found to exhibit the highest intrinsic strength and highest intrinsic thermal conductivity among all existing materials. High strength imparts good structural integrity to the resulting electrode.

(2) A high thermal conductivity implies a high heat dissipation rate. This is an important feature since the charge and discharge operations of a battery produce a great amount of heat. Without a fast heat dissipation rate, the battery cannot be charged or discharged at a high rate.

(3) The most commonly used conductive additives are carbon black (CB) or acetylene black (AB), which are not very electrically conductive. Graphene sheets have an electrical conductivity (up to 20,000 S/cm) that is several orders of magnitude higher than that of CB or AB (typically 0.01-10 S/cm).

(4) Graphene sheets in the interior and the exterior surface of a particulate provide not only a robust 3-D network of electron-conducting paths and high conductivity, but also enable the electrode materials to be readily made into electrodes with a high tap density and long-term cycling stability.

(5) The embracing graphene sheets effectively isolate the anode active materials (e.g., Si and SnO$_2$ particles) from the electrolyte, which otherwise could react with these active materials, thereby reducing the reversible capacity.

(6) Quite surprisingly, spray-drying readily produces graphene-enhanced particulates of a spherical shape that is conducive to the formation of interconnected pores in an actual electrode to enable easy penetration of electrolyte. The embraced primary particles (e.g. Si and SnO$_2$) having a small diameter (typically smaller than 1 μm and preferably smaller than 100 nm) provide a short lithium diffusion path for lithium to enter and leave. This is particularly desirable for power tool and electric vehicle applications where the battery must be capable of being charged and discharged at a high rate.

(7) Further surprisingly, the embracing graphene sheets, being strong and elastic, appear to be capable of effectively cushioning the large volume changes of electro-active materials such as Si.

(8) The presently invented graphene-enhanced particulate approach is applicable to both the cathode and anode and, hence, is good for both lithium metal batteries (for their cathodes) and lithium ion batteries (for both anodes and cathodes).

In summary, the presently invented graphene-enhanced particulates surprisingly impart the following highly desirable attributes to a lithium battery electrode: high reversible capacity, low irreversible capacity, high tap density, electrode fabrication ease (shape of secondary particles typically spherical or near spherical), small primary particle sizes (for high-rate capacity), compatibility with commonly used electrolytes (embracing graphene sheets help to isolate active material particles from electrolyte), and long charge-discharge cycle life.

What is claimed is:

1. A particulate comprising:
   a primary active material particle or an aggregate body of a plurality of the primary active material particles; and
   a single sheet of graphene or a plurality of graphene sheets;
   wherein at least one of the primary active material particle or the aggregate body of the plurality of the primary active material particles is surrounded by the single sheet of graphene or the plurality of graphene sheets;
   wherein the single sheet of graphene or the plurality of graphene sheets has an oxygen content of less than 25% by weight; wherein the single sheet of graphene or the plurality of graphene sheets further comprises an element selected from hydrogen, fluorine, oxygen in an edge or surface of each of the graphene planes; and
   wherein the particulate has a dimension smaller than 100 nm.

2. The particulate of claim 1, wherein the single sheet of graphene or the plurality of graphene sheets provides a continuous electrical path across the particulate.

3. The particulate of claim 1, further comprising graphite or carbon;
   where the graphite or carbon is added to the interior of the particulate.

4. The particulate of claim 3, wherein the graphite or carbon is coated on or in electronic contact with the primary active material particle, the aggregate body of the plurality of primary active material particles, or the single sheet of graphene or the plurality of graphene sheets.

5. The particulate of claim 4, wherein the graphite or carbon is selected from polymeric carbon, amorphous carbon, chemical vapor deposition carbon, coal tar pitch, petroleum pitch, meso-phase pitch, carbon black, coke, acetylene black, activated carbon, fine expanded graphite particle with a dimension smaller than 100 nm, artificial graphite particle, natural graphite particle, or a combination thereof.

6. The particulate of claim 1, wherein the single sheet of graphene or the plurality of graphene sheets is in an amount of at least 0.01% by weight, all based on the total weight of said particulate.

7. The particulate of claim 1, wherein the single sheet of graphene or the plurality of graphene sheets is in an amount of at least 1% by weight, all based on the total weight of said particulate.

8. The particulate of claim 1, wherein the element is in an amount of less than 5% by weight, based on the total weight of the graphene planes.

9. The particulate of claim 1, wherein the single sheet of graphene or the plurality of graphene sheets further comprises graphene oxide or graphene fluoride.

10. The particulate of claim 1, wherein the primary active material particle has in the form of a spherical particle, nanowire, nanofiber, nanorod, nanotube, or combination thereof.

11. The particulate of claim 1, wherein the particulate is spherical or ellipsoidal in shape.

12. The particulate of claim 1, wherein the particulate is a cathode particulate or an anode particulate.

13. The particulate of claim 12, wherein the particulate comprises an element selected from Si, Ge, Sn, Cd, Sb, Pb, Bi, Zn, Al, Co, Ni or Ti.

14. The particulate of claim 12, wherein the particulate comprises Si or Si as a primary element and has a content of no less than 20% by weight based on the total weight of the cathode particulate or anode particulate.

15. The particulate of claim 12, wherein the particulate comprises the material selected from the group consisting of:
  (a) alloys or intermetallic compounds of Si, Ge, Sn, Pb, Sb, Bi, Zn, Al, Ti, Ni, Co, or Cd with other elements, wherein the alloys or compounds are stoichiometric or non-stoichiometric;
  (b) oxides, carbides, nitrides, sulfides, phosphides, selenides, and tellurides of Si, Ge, Sn, Pb, Sb, Bi, Zn, Al, Ti, Fe, Ni, Co, or Cd, and their mixtures, composites, or lithium-containing composites,
  (c) salts and hydroxides of Sn;
  (d) lithium titanate, lithium manganate, lithium aluminate, lithium-containing titanium oxide, lithium transition metal oxide; and
  (e) combinations thereof.

16. The particulate of claim 12, wherein the particulate comprises the material selected from the group consisting of:
  oxides of Si, Ge, Sn, Pb, Sb, Bi, Zn, Al, Ti, Fe, Ni, Co, or Cd, and their mixtures or composites.

17. The particulate of claim 12, wherein the particulate comprises a Si nanoparticle, Si nanowire, $Co_3O_4$ nanoparticle, Sn nanoparticle, $SnO_2$ nanoparticle, lithiated titanium dioxide, lithiated titanium oxide, lithium titanate, or $Li_4Ti_5O_{12}$, and combination thereof.

18. The particulate of claim 12, wherein the single sheet of graphene or the plurality of graphene sheets is in an amount of from about 0.01% to about 99% by weight, based on the total weight of the anode particulate.

19. The particulate of claim 12, wherein the cathode particulate further comprises lithium cobalt oxide, doped lithium cobalt oxide, lithium nickel oxide, doped lithium nickel oxide, lithium manganese oxide, doped lithium manganese oxide, lithium iron phosphate, lithium manganese phosphate, lithium vanadium oxide, doped vanadium oxide, lithium vanadium phosphate, lithium transition metal phosphate, lithium mixed-metal phosphates, metal sulfides, metal phosphides, metal halogenide, and combinations thereof.

20. The particulate of claim 12, wherein the single sheet of graphene or the plurality of graphene sheets is in an amount of from about 0.01% to about 30% by weight, based on the total weight of the cathode particulate.

21. An electrode comprising the particulate of claim 1.

22. The electrode of claim 21, wherein the electrode forms a 3D network of electron conducting path when the particulate is multiple-packed in the electrode.

23. The electrode of claim 21, wherein the electrode is an anode or a cathode.

24. A lithium battery comprising:
an anode comprising the particulate of claim 1.

25. The lithium battery of claim 24, wherein the anode comprises a Si anode particulate and the anode has a reversible specific capacity of greater than 1,000 mAh/g for longer than 500 cycles, calculated on the basis of the total anode particulate weight.

26. A lithium battery comprising:
a cathode comprising the particulate of claim 1.

27. The process for preparing the particulate of claim 1, the process comprising:
preparing a precursor mixture of graphene or graphene precursor with a primary active material or primary active material precursor; and
thermally and/or chemically converting the precursor mixture to form the particulate.

28. The process of claim 27, wherein the step of preparing a precursor mixture comprises preparing a suspension of graphene or graphene precursor in a liquid medium and mixing the primary active material or primary active material precursor into the suspension.

29. The process of claim 28, wherein the process further comprises a step of drying the suspension to form the precursor mixture.

30. The process of claim 28, wherein the process further comprises a step of drying the suspension to form the precursor mixture using spray-drying, spray-pyrolysis, fluidized-bed drying, or atomization or aerosolizing step.

* * * * *